(12) United States Patent
Hajri et al.

(10) Patent No.: US 12,489,505 B2
(45) Date of Patent: Dec. 2, 2025

(54) IMPROVING PRECODING

(71) Applicant: Nokia Technologies Oy, Espoo (FI)

(72) Inventors: Salah Eddine Hajri, Antony (FR);
William Hillery, Lafayette, IN (US);
Filippo Tosato, Bures sur Yvette (FR);
Eugene Visotsky, Buffalo Grove, IL
(US); Frederick Vook, Schaumburg, IL
(US); Rana Ahmed Salem, Munich
(DE); Marco Maso, Issy les
Moulineaux (FR)

(73) Assignee: NOKIA TECHNOLOGIES OY,
Espoo (FI)

( * ) Notice: Subject to any disclaimer, the term of this patent is extended or adjusted under 35 U.S.C. 154(b) by 514 days.

(21) Appl. No.: 17/908,188

(22) PCT Filed: Feb. 22, 2021

(86) PCT No.: PCT/EP2021/054310
§ 371 (c)(1),
(2) Date: Aug. 30, 2022

(87) PCT Pub. No.: WO2021/175634
PCT Pub. Date: Sep. 10, 2021

(65) Prior Publication Data
US 2023/0361842 A1    Nov. 9, 2023

Related U.S. Application Data

(60) Provisional application No. 63/007,135, filed on Apr. 8, 2020, provisional application No. 62/986,206, filed on Mar. 6, 2020.

(51) Int. Cl.
*H04B 7/0456* (2017.01)
*H04B 7/06* (2006.01)

(52) U.S. Cl.
CPC ......... *H04B 7/0639* (2013.01); *H04B 7/0617* (2013.01); *H04B 7/0626* (2013.01)

(58) Field of Classification Search
CPC ... H04B 7/0639; H04B 7/0617; H04B 7/0626
See application file for complete search history.

(56) References Cited

U.S. PATENT DOCUMENTS

| 9,628,311 B2 | 4/2017 | Bertrand et al. |
| 2016/0128023 A1 | 5/2016 | Gustavsson et al. |

(Continued)

FOREIGN PATENT DOCUMENTS

| CN | 103460618 A | 12/2013 |
| EP | 3116155 A1 | 1/2017 |

(Continued)

OTHER PUBLICATIONS

Office Action received for corresponding Vietnamese Patent Application No. 1-2022-06474, dated Sep. 5, 2024, 2 pages of Office Action and 2 pages of translation available.

(Continued)

*Primary Examiner* — Marcus Smith
*Assistant Examiner* — Zhaohui Yang
(74) *Attorney, Agent, or Firm* — Carter, DeLuca & Farrell LLP

(57) ABSTRACT

There is provided a method at a network node of a communication network, comprising: receiving an uplink reference signal from a user equipment; estimating, based on the received uplink reference signal, delay information regarding a delay profile of a communication channel between the user equipment and the network node and spatial information regarding the communication channel; applying both the delay information and the spatial information in precoding of at least one downlink reference signal; transmitting the at least one precoded downlink reference signal to the (Continued)

user equipment; and receiving, from the user equipment as a response to the transmission of the at least one precoded downlink reference signal, channel information, the channel information indicating at least non-zero coefficients of at least one channel transmission layer.

1 Claim, 9 Drawing Sheets

(56) References Cited

U.S. PATENT DOCUMENTS

| | | | |
|---|---|---|---|
| 2017/0187499 | A1 | 6/2017 | Hwang et al. |
| 2019/0280752 | A1* | 9/2019 | Mittal ................. H04B 7/066 |
| 2019/0327060 | A1 | 10/2019 | Liu |
| 2019/0372641 | A1* | 12/2019 | Muruganathan ..... H04B 7/0456 |
| 2020/0162142 | A1* | 5/2020 | Rahman ............... H04B 7/0639 |
| 2021/0314122 | A1* | 10/2021 | Jin ........................ H04L 5/005 |
| 2021/0320694 | A1* | 10/2021 | Zhong ............... H04L 25/03343 |
| 2022/0006500 | A1* | 1/2022 | Wei ...................... H04W 28/06 |
| 2022/0149908 | A1* | 5/2022 | Gao ..................... H04B 7/0634 |

FOREIGN PATENT DOCUMENTS

| | | |
|---|---|---|
| EP | 3576312 A1 | 12/2019 |
| WO | 2017/062902 A1 | 4/2017 |

OTHER PUBLICATIONS

Office action received for corresponding Indonesian Patent Application No. P00202210810, dated Dec. 4, 2024, 4 pages of office action and 3 pages of translation available.

Office action received for corresponding Chinese Patent Application No. 202180029077.X, dated Jan. 20, 2025, 11 pages of office action and No. page of translation available.

"New WID: Further enhancements on MIMO for NR", 3GPP TSG RAN Meeting #86, RP-193133, Agenda: 9.1.1, Samsung, Dec. 9-12, 2019, 5 pages.

"Discussion on CSI enhancement", 3GPP TSG RAN WG1 Meeting #98, R1-1908065, Agenda: 7.2.8.1, Huawei, Aug. 26-30, 2019, 14 pages.

"MU-CSI Rank extension parameter setting and UCI design", 3GPP TSG RAN WG1 Meeting #97, R1-1907315, Agenda: 7.2.8.1, Nokia, May 13-17, 2019, 13 pages.

"TEI proposal: on aperiodic CSI/CSI-RS", 3GPP TSG RAN WG1 Meeting #98, R1-1909541, Agenda: 7.2.14, ZTE, Aug. 26-30, 2019, 4 pages.

"Offline summary of TEI proposal on CSI trigger for non-active BWP", 3GPP TSG RAN WG1 Meeting #98, R1-1909714, Agenda: 7.2.14, ZTE, Aug. 26-30, 2019, 3 pages.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Physical layer measurements (Release 16)", 3GPP TS 38.215, V16.0.1, Jan. 2020, pp. 1-21.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

Zhong et al., "FDD Massive MIMO Uplink and Downlink Channel Reciprocity Properties: Full or Partial Reciprocity?", arXiv, Dec. 31, 2019, 5 pages.

"Class B Advanced CSI Feedback", 3GPP TSG-RAN WG1 #88, R1-1702364, Agenda: 7.2.2.6, Ericsson, Feb. 13-17, 2017, pp. 1-7.

"Discussion on reciprocity based DL CSI feedback", 3GPP TSG RAN WG1 Meeting #88, R1-1701683, Agenda: 8.1.2.3.4, Huawei, Feb. 13-17, 2017, 3 pages.

Ahmed et al., "Comparison of Explicit CSI Feedback Schemes for 5G New Radio", IEEE 89th Vehicular Technology Conference (VTC2019-Spring), Apr. 28-May 1, 2019, 5 pages.

"CSI Overhead Reduction for Type II codebook up to rank 2", 3GPP TSG RAN WG1 Meeting #96, R1-1902562, Agenda: 7.2.8.1, Nokia, Feb. 24-Mar. 1, 2019, 17 pages.

"3rd Generation Partnership Project; Technical Specification Group Radio Access Network; NR; Physical layer procedures for data (Release 16)", 3GPP TS 38.214, V16.0.0, Dec. 2019, pp. 1-148.

"Outcome of offline session for CSI enhancement for MU-MIMO support", 3GPP TSG RAN WG1 Meeting #95, R1-1814201, Agenda: 7.2.8.1, Samsung, Nov. 12-16, 2018, 3 pages.

"Feature lead summary for MU-MIMO CSI", 3GPP TSG RAN WG1 98, R1-1908498, Agenda: 7.2.8.1, Samsung, Aug. 26-30, 2019, 15 pages.

"3rd Generation Partnership Project; Technical Specification Group Radio Access Network; NR; Multiplexing and channel coding (Release 16)", 3GPP TS 38.212, V16.0.0, Dec. 2019, pp. 1-145.

"Partial reciprocity based CSI acquisition mechanism", 3GPP TSG RAN WG1 Meeting #90, R1-1714338, Agenda: 6.1.2.2.3, Huawei, Aug. 21-25, 2017, 6 pages.

"Final Report of 3GPP TSG RAN WG1 #97 v1.0.0", 3GPP TSG RAN WG1 Meeting #98, R1-1907973, MCC Support, Aug. 26-30, 2019, 1-163.

Clerckx et al., "MIMO in LTE, LTE-Advanced and WiMAX", Mimo Wireless Networks (Second Edition), Channels, Techniques and Standards for Multi-Antenna, Multi-User and Multi-Cell Systems, Chapter 14, 2013, pp. 597-635.

"5G/NR—Beam Management", ShareTechnote, Retrieved on Sep. 15, 2022, Webpage available at : https://www.sharetechnote.com/html/5G/5G_Phy_BeamManagement.html.

Han et al., "FDD Massive MIMO Based on Efficient Downlink Channel Reconstruction", IEEE Transactions on Communications, Jun. 2019, pp. 1-30.

"IEEE 802.11", Wikipedia, Retrieved on Sep. 13, 2022, Webpage available at : https://en.wikipedia.org/wiki/IEEE_802.11.

International Search Report and Written Opinion received for corresponding Patent Cooperation Treaty Application No. PCT/EP2021/054310, dated May 18, 2021, 13 pages.

\* cited by examiner

900: RECEIVING, FROM GNB, A PLURALITY OF DL REFERENCE SIGNALS, WHEREIN PRECODING OF THE PLURALITY OF DL REFERENCE SIGNAL IS BASED ON M' FD COMPONENTS

902: ESTIMATING M STRONGEST FD COMPONENTS AMONGST THE M' FD COMPONENTS BASED ON THE RECEIVED PLURALITY OF DL REFERENCE SIGNALS, WHERE M IS SMALLER THAN M'

904: TRANSMITTING FEEDBACK OF THE RECEIVED PLURALITY OF DL REFERENCE SIGNALS TO GNB, THE FEEDBACK PROVIDING INFORMATION OF THE DETERMINED M STRONGEST FD COMPONENTS

FIG. 9

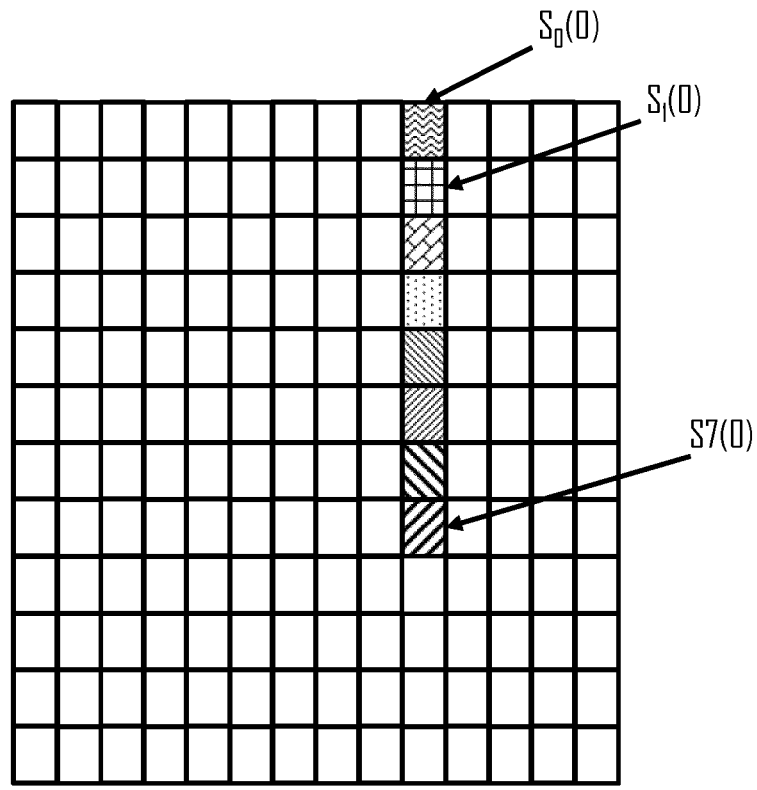

FIG. 10

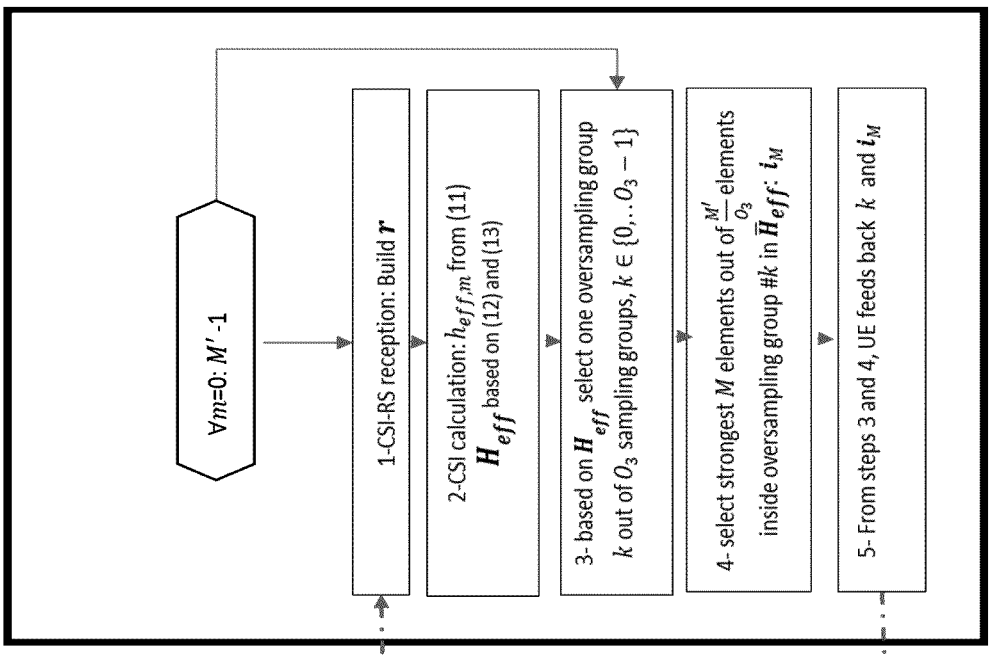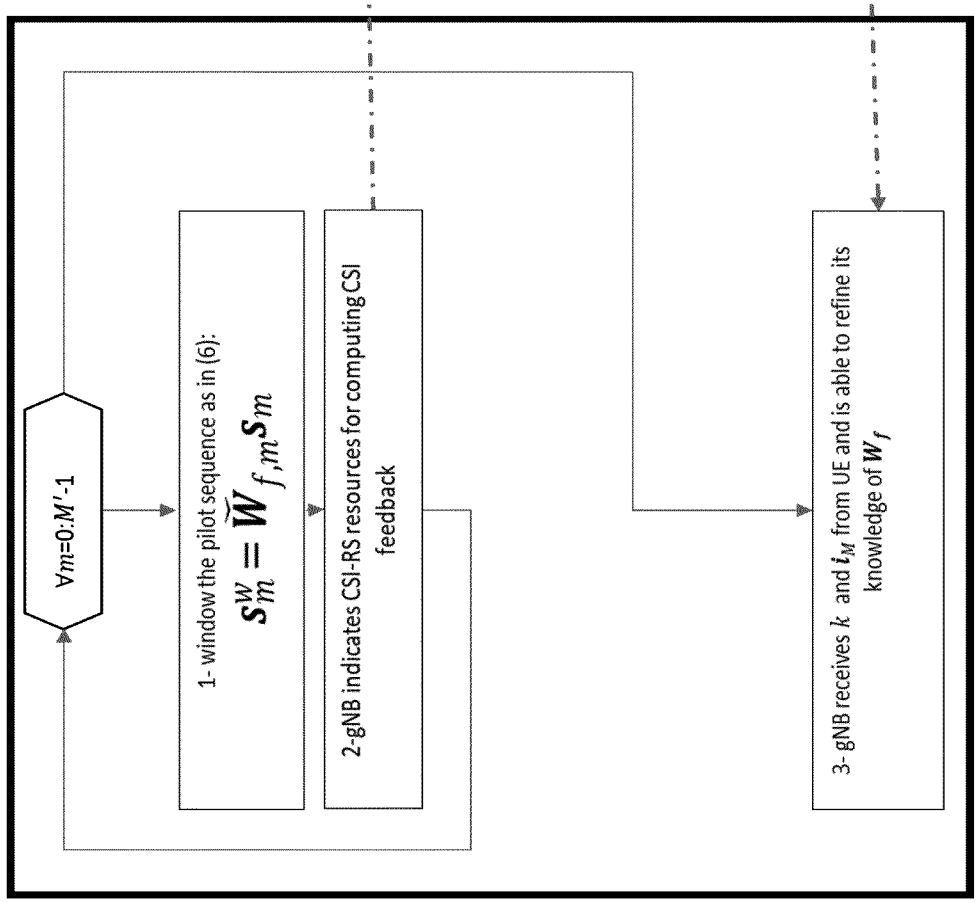
FIG. 11

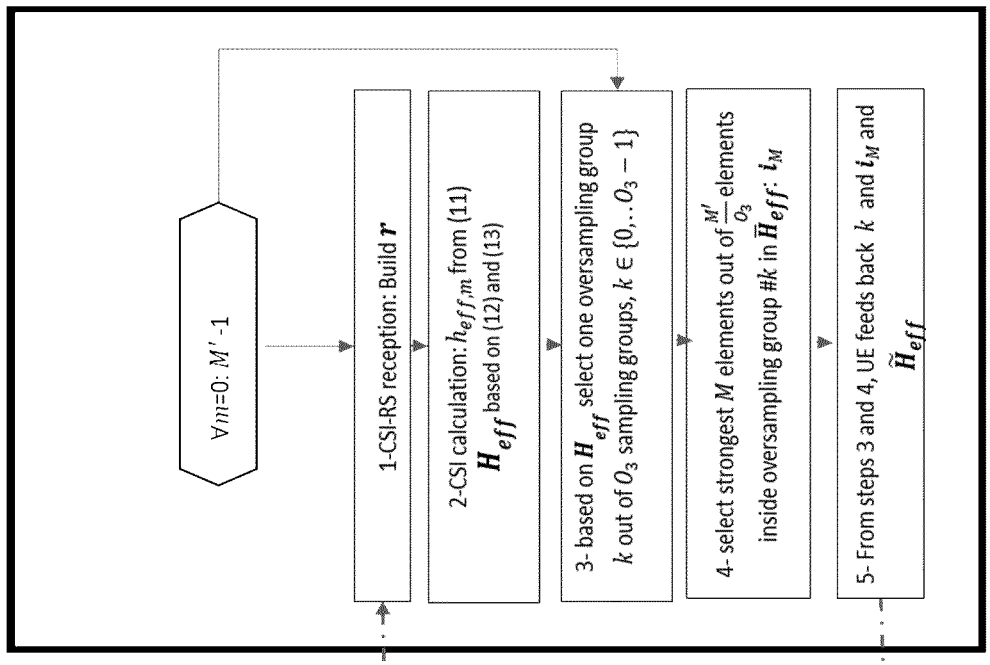
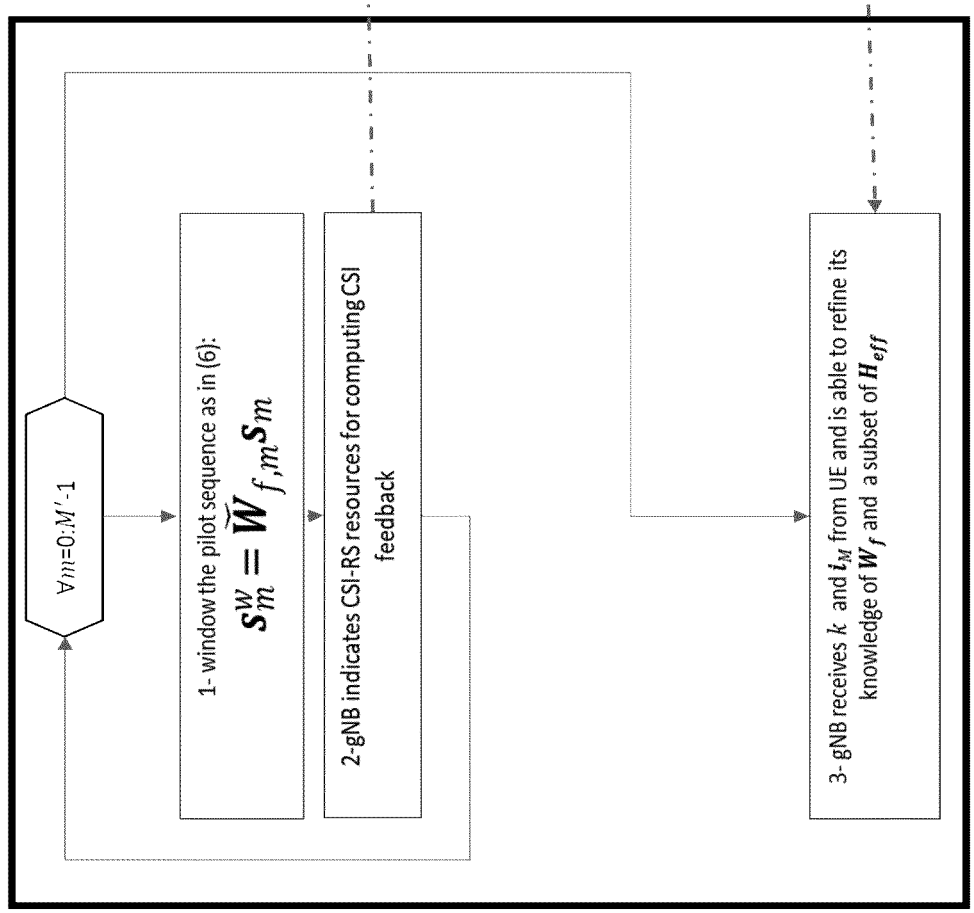
FIG. 12

IMPROVING PRECODING

TECHNICAL FIELD

Various example embodiments relate generally to precoding which is based on partial reciprocity.

BACKGROUND

In order to improve communication throughput and reliability, transmission directivity may be applied in wireless radio communications. Directivity may increase signal strength at the receiver side, which may enable increased throughput and/or reduced transmit power. Precoding may be used to achieve directivity by the transmitter. Precoding aims at matching multi-antenna transmission to the current channel conditions. This is achieved by multiplying the signal with antenna-specific complex weights (phase and/or amplitude) that depend on the current channel conditions. Precoding can be codebook based, in which case a finite set of precoding vectors/matrices are defined and used for transmission. The number of vectors is a trade-off between performance and feedback overhead. The alternative to codebook-based precoding is non-codebook-based precoding, where any vectors/matrices can be used, or classical beamforming which does not necessarily require channel knowledge but is based on angle-of-arrival information.

In 5G NR, advanced channel state information (CSI) codebooks were specified to accommodate both single and multi-user MIMO operations. Rel-15 specified type I and type II codebooks, the latter of which provides considerable precoding matrix indicator (PMI) accuracy. PMI is fed back by a user equipment to the base station, to convey information regarding which precoder(s) from the codebook of precoders would be appropriate from the user equipment's perspective. CSI enhancements continued in Rel-16 where the reduction of type II overhead was the focus in order to alleviate the strain on uplink resources.

Nevertheless, 3GPP identified that further improvements are needed.

BRIEF DESCRIPTION

According some aspects, there is provided the subject matter of the independent claims. Some further aspects are defined in the dependent claims. The embodiments that do not fall under the scope of the claims are to be interpreted as examples useful for understanding the disclosure.

LIST OF THE DRAWINGS

In the following, the invention will be described in greater detail with reference to the embodiments and the accompanying drawings, in which FIG. 1 presents a communication network, according to an embodiment;

FIGS. 8 and 9 illustrate methods, according to some embodiments;

FIG. 10 shows a physical resource block carrying downlink reference signals, according to an embodiment; and FIGS. 11 and 12 illustrates signaling flow diagrams, according to some embodiments.

DESCRIPTION OF EMBODIMENTS

Figure 1:
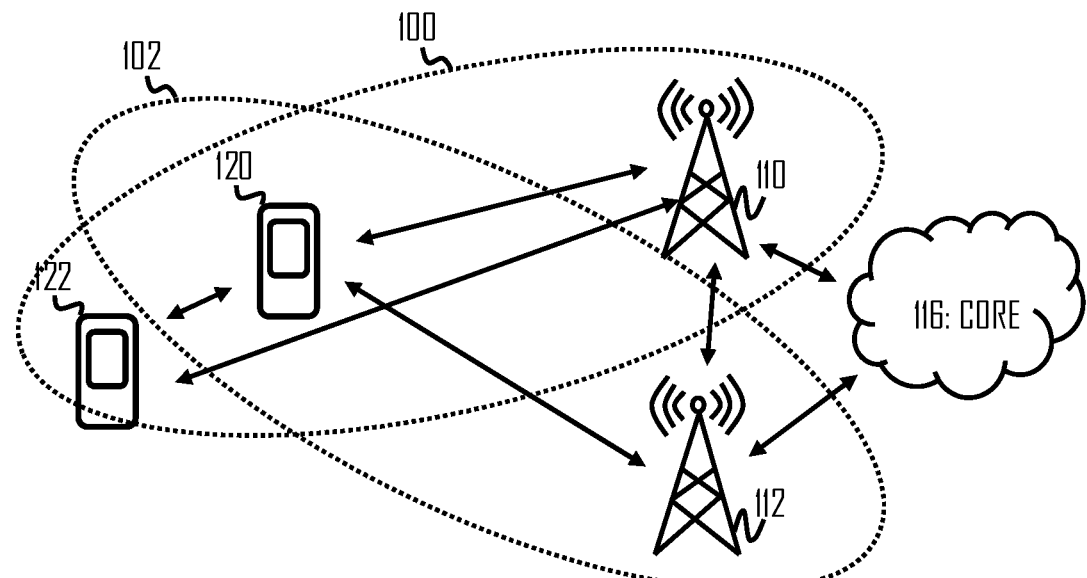

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few nonlimiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell. The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

As said, 3GPP identified that further improvements can be achieved by exploiting partial uplink and downlink channel reciprocity. In Rel-17, work on CSI enhancements for NR continues. In the description of the work item "*Further enhancements on MIMO for NR*", one topic is to evaluate and, if needed, specify Type II port selection codebook enhancement (based on Rel.15/16 Type II port selection) where information related to angle(s) and delay(s) are estimated at the gNB based on uplink sounding reference signal (SRS) by utilizing downlink/uplink (DL/UL) reciprocity of angle and delay, and the remaining DL CSI is reported by the UE. This may provide better trade-off among UE complexity, performance and reporting overhead, especially in frequency division duplex (FDD) frequency range 1 (FR1) environment.

The incorporation of partial reciprocity operations in 5G NR CSI framework may be based on type II port selection codebook enhancements. Type II port selection codebook is based on spatially beamformed CSI reference signals (RSs). Spatially beamformed CSI-RS has been introduced since LTE release 13, in what is known as class B CSI feedback. Up to K=8 orthogonal (time or frequency) CSI-RS resources may be assigned per user. Each CSI-RS resource consists of $N_k=1 \ldots 8$ antenna ports (AP) per spatial direction.

The concept of antenna port (AP), oftentimes referred to as port, can be understood as a logical abstraction of a physical resource that maps to physical antennas. The number of physical antenna elements available is not necessarily equal to the number of APs. Every antenna port takes a resource grid as input. The resource grids may be different between each other. An antenna port may map to more than one physical antenna. Additionally, a physical antenna may be mapped to multiple antenna ports.

Figure 2A:
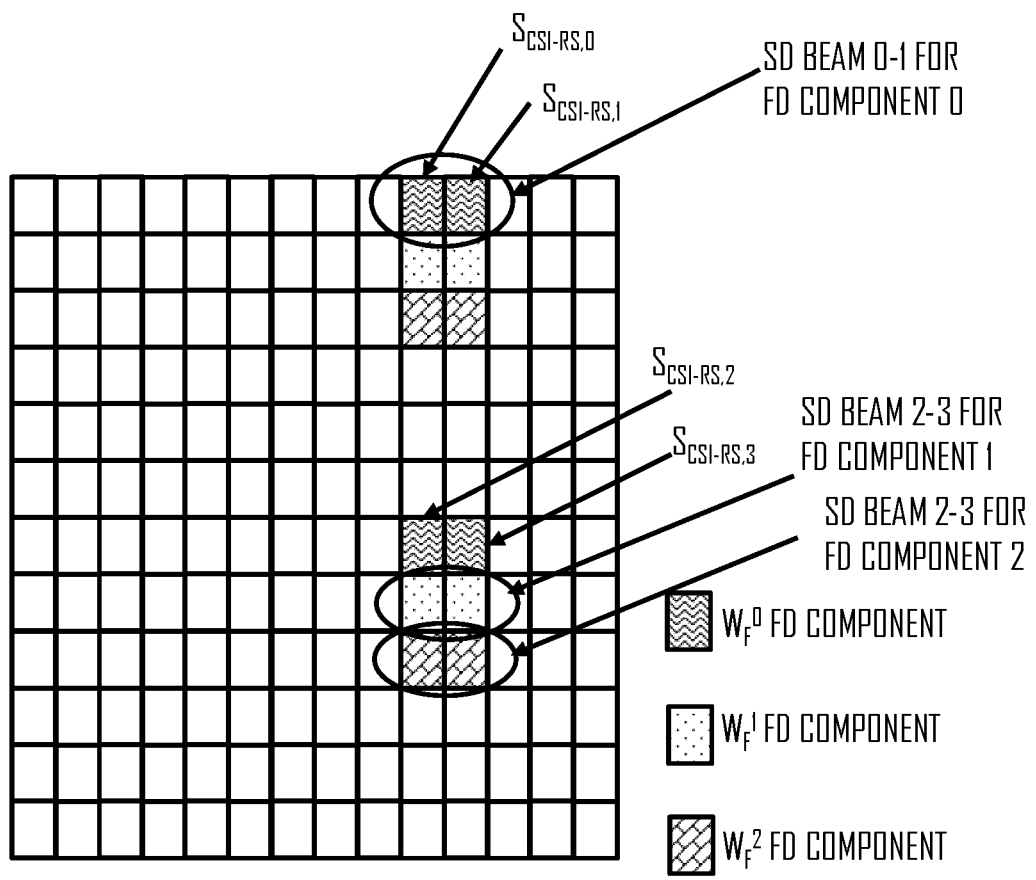
FIGS. 2A and 2B shows spatial beams carrying downlink reference signals and consequent reporting of channel state information from a user equipment, according to an embodiment.
Figure 2B:
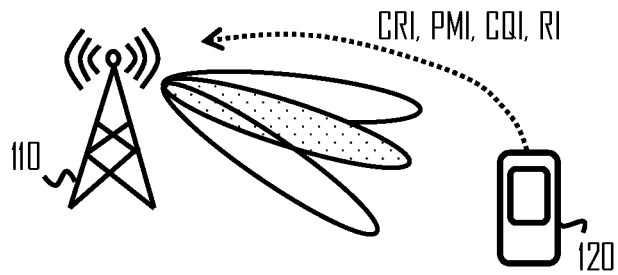

In FIG. 2B it is shown that the UE 120 may send back a CSI-RS indicator (CRI), which informs the gNB 110 about the best beam. The UE 120 may also send the PMI, a rank indicator (RI), and channel quality indicator (CQI). Once the 'favourite' spatial direction is determined for the channel between the UE 120 and the gNB 110, either by the UE 120 feeding back the CRI or by the gNB 110 exploiting channel reciprocity on UL, subsequent transmission is done assuming that one spatial direction (beam #2 in the example of FIG. 2B).

FIG. 2A shows an example embodiment of spatially beamformed CSI-RSs with $N_k=4$ and three frequency domain (FD) components (M=3), comprising $W_f^0$, $W_f^1$ and $W_f^2$. The vertical dimension depicts 12 subcarriers in frequency while the horizontal dimensions is for OFDM symbols in time. The depicted block may thus be seen as one physical resource block (PRB) having 12×14 resource elements (RE). The blocks with wavelike pattern depict spatial domain (SD) beams 0-3 for FD component 0, the blocks with dotted pattern depict SD beams 0-3 for FD component 1, and the blocks with bricklike pattern depict SD beams 0-3 for FD component 2. E.g. the uppermost two wavelike pattern blocks depict SD beams 0-1 for the FD component 0, and the lowermost wavelike pattern blocks depict SD beams 2-3 for the FD component 0. Same logic with the other blocks with patterns. The gNB may send the depicted PRB carrying at least these CSI-RSs to a particular spatial direction. The gNB may send another PRB with another set of CSI-RSs, based on same or different $W_1$ and $W_f$, to another spatial direction. The UE may receive these downlink reference signals, as will be described later.

For one spatially beamformed CSI-RS (e.g. beam #2) and assuming $N_t>N_k$ transceiver units (TXRUs) of the transmitter (e.g. gNB), the CSI-RS is precoded using grid of beams (GoB) matrix $$\tilde{W}_{1_{N_t \times N_k}}.$$

The received signal at $N_k$ resources for 1 PRB is $$R_{1 \times N_k} = H_{1 \times N_t} \tilde{W}_{1_{N_t \times N_k}} \begin{bmatrix} S_{CSI-RS,0-1} & 0 \\ 0 & S_{CSI-RS,2-3} \end{bmatrix},$$

where $S_{CSI-RS,0-1}=[S_{CSI-RS,0} \ S_{CSI-RS,1}]$ and $S_{CSI-RS,2-3}=[S_{CSI-RS,2} \ S_{CSI-RS,3}]$ of FIG. 2A.

The effective channel is then $$H_{eff_{1 \times N_k}} = H_{1 \times N_t} \tilde{W}_{1_{N_t \times N_k}}.$$

In this example, this means that effectively the UE 120 observes a channel with $N_k=4<N_t$ virtual antenna ports.

Assuming a CSI-RS density of 1, the received signal across all $n_{PRB}$ PRBs (stacked horizontally)

$$R_{1 \times N_k n_{PRB}} = H_{1 \times N_t N_3} \begin{bmatrix} \tilde{W}_1 & \\ & \ddots \\ & & \tilde{W}_1 \end{bmatrix}_{N_t n_{PRB} \times N_k n_{PRB}}$$

$$\begin{bmatrix} S_{B_{N_k \times N_k}} & \\ & \ddots \\ & & S_{B_{N_k \times N_k}} \end{bmatrix}_{N_k n_{PRB} \times N_k n_{PRB}} =$$

$$H_{1 \times N_t n_{PRB}} \overline{W}_1 \begin{bmatrix} S_{B_{N_k \times N_k}} & \\ & \ddots \\ & & S_{B_{N_k \times N_k}} \end{bmatrix}_{N_k n_{PRB} \times N_k n_{PRB}},$$

where $S_{B_{N_k \times N_k}} = \begin{bmatrix} S_{CSI-RS,0-1} & 0 \\ 0 & S_{CSI-RS,2-3} \end{bmatrix}$ and $$\overline{W}_1 = I_{n_{PRB}} \otimes \tilde{W}_{1_{N_t \times N_k}}$$

On one path comprising an AP of a transmit gNB 110 and an AP of the receive UE 120, the correlation among the subcarriers (subbands) in frequency domain can be exploited so as to reduce the amount of CSI feedback overhead needed. For example, in NR Rel.16, a linear combination subband matrix $W_2$, which is of size $2L \times N_3$ where $N_3$ is the number of subbands and $2L$ is the number of spatial domain (SD) beams, is frequency domain (FD) compressed into $\tilde{W}_2$, which is of size $2L \times M$ $$\tilde{W}_2 = W_2 W_f^H$$

where the columns of the FD basis subset $W_f^H$ are taken from a DFT codebook. Similarly, for time domain (TD) explicit CSI feedback, the actual channel frequency response matrix (CFR) $H_{N_a \times 2L}$ with $N_a$ active subcarriers and $2L$ SD beams, is compressed into time domain matrix $G_{N_s \times 2L}$ $$G_{N_s \times 2L} = \left( W_{f_{N_s \times N_a}} W_{f_{N_a \times N_s}}^H \right)^{-1} W_{f_{N_a \times N_s}}^H H_{N_a \times 2L}$$

where $N_s$ is the length of the channel support (i.e. location of active taps) and the columns in $$W_{f_{N_s \times N_a}}$$

are derived from a DFT codebook.

In an embodiment, within a PRB, code division multiplexing (CDM) can be applied. For example, in every PRB, CDM is applied on ports in close REs (time or frequency) to guarantee orthogonality. Then, after receiving the CSI-RS pilots, the UE may 'undo' the CDM within the PRB and then operate as described. In other words, CDM works on top of the described scheme.

In frequency division duplex (FDD) 5G systems, the gNB uses downlink reference signal (e.g. CSI-RS) transmission and type I or Type II codebook feedback from the UE in order to obtain CSI. While Rel-15 and Rel-16 type II provide noticeable accuracy, they suffer from considerable feedback overhead and some performance loss due to quantization errors.

A proper design of partial reciprocity-based CSI process entails dealing with several aspects, including, downlink reference signals precoders design, uplink feedback format (uplink control information, UCI, design in NR), timely triggering of uplink reference signals, such as SRS, and beamformed reference signal transmission in the downlink, such as CSI-RS, efficient configuration of reciprocity-based CSI reporting in radio resource configuration (RR), such as reference signals configuration, trigger states, etc.

Although full channel reciprocity does not hold in FDD systems, the gNB may rely on SRS transmission, from the UE, in order to obtain wide-band information which are typically similar for uplink and downlink channels. Reciprocal wideband parameters in FDD systems may include paths azimuth and elevation angles of arrival and departure, in addition to path delays. However, errors in estimating reciprocal channel information may still occur, especially for weaker paths which can be problematic as the gNB may subsequently use erroneous information to beamform downlink reference signals. Consequently, it might be beneficial to retain flexibility in defining the downlink reference signals precoders and the subsequent operations at the UE side.

Additionally, incorporating reciprocity-based CSI operations requires an update to the uplink control information format in order to further reduce the reporting overhead. Indeed, following UE transmission of reference signals (e.g. SRS), part of the wideband channel characteristics may be available at the gNB side. Consequently, uplink control information format needs to be optimized in order to avoid information redundancy and to keep reporting overhead to a strict minimum. While type II port selection codebook covers spatial reciprocity of the channel, it does not leverage delays reciprocity.

To at least partially further tackle the above-mentioned drawbacks, there is provided efficient and flexible designs for downlink reference signals precoders, to leverage both spatial and delay reciprocity between uplink and downlink. Additionally, an improved uplink control information format is proposed. In other words, there is proposed a solution that enables to take into consideration the angle(s) and delay(s) information that are estimated at the gNB 110, based on UE's uplink reference signals transmission (e.g. SRS in NR), in the precoding of downlink reference signals (e.g. CSI-RS) that are intended for downlink CSI estimation at the UE side. The UE 120 may, subsequently, report the remaining downlink CSI (e.g. frequency selective information), based on the received precoded downlink reference signals. The solution builds on top of the framework of type II port selection enhancements.

Figure 3:
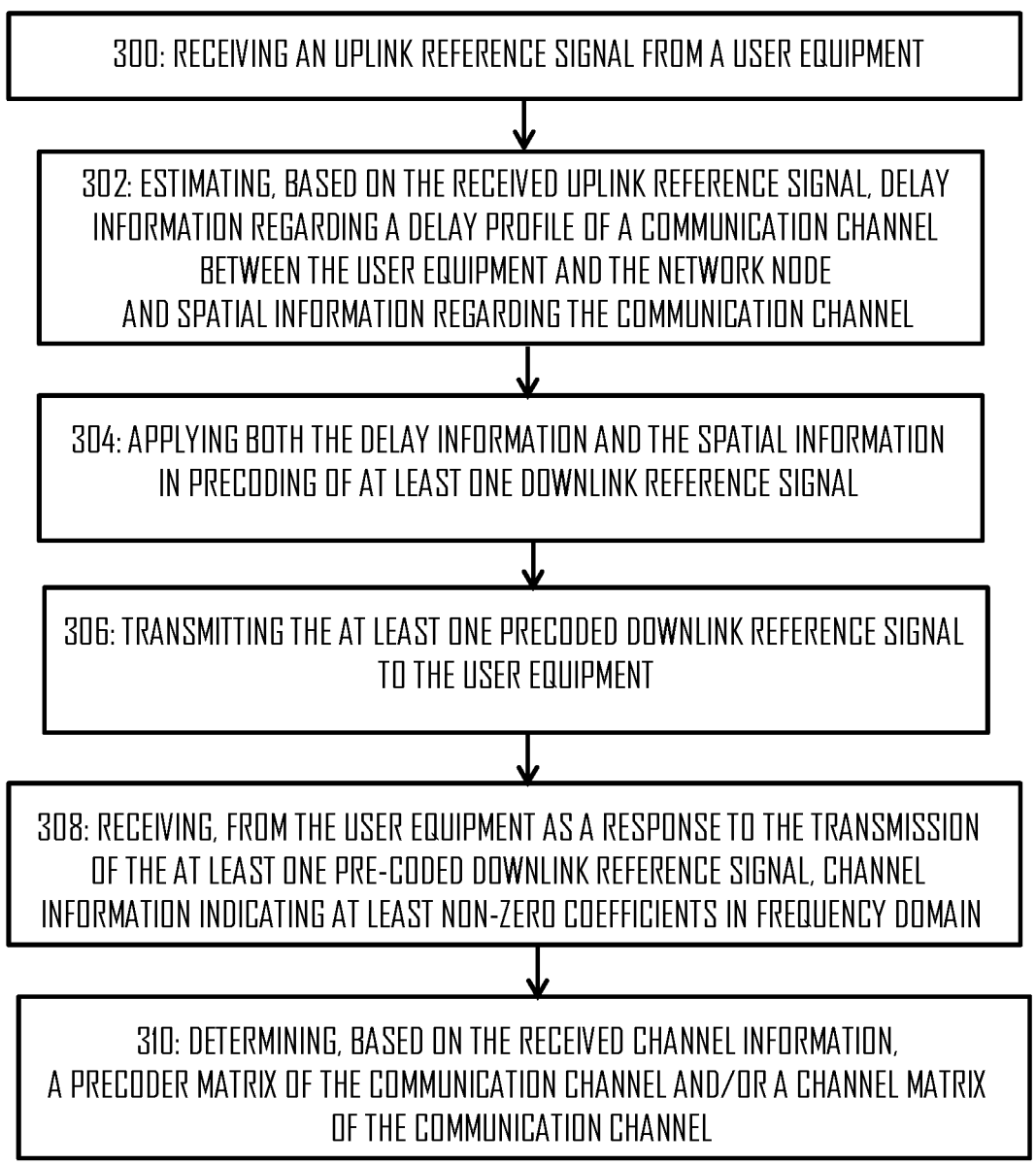
FIGS. 3 and 4 illustrate methods, according to some embodiments.
Figure 4:
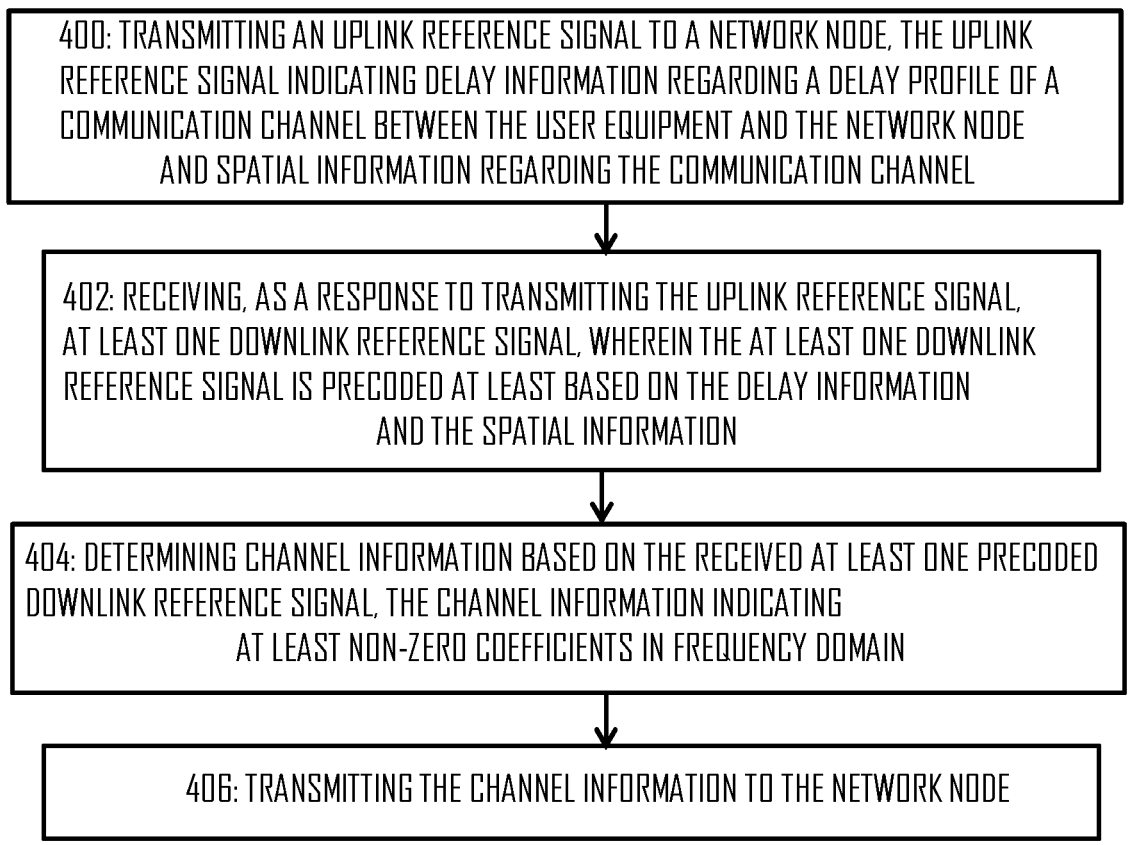

FIGS. 3 and 4 depict example methods for reciprocity-based CSI measurements and reporting. The method of FIG. 3 may be performed by a network node, such as the gNB 110 of FIG. 1. The method of FIG. 4 may be performed by a user equipment, such as the UE 120 of FIG. 1.

As shown in FIG. 3, the gNB 110 may in step 300 receive an UL reference signal from a UE 120. In an embodiment, the UL reference signal comprises a sounding reference signal (SRS). In an embodiment, the UE 120 transmits periodic, aperiodic or semi-persistent uplink reference signal to the gNB 110.

In step 302, the gNB 110 may estimate, based on the received UL reference signal, delay information regarding a delay profile of a communication channel between the UE 120 and the gNB 110. The gNB 110 may further determine spatial information regarding the communication channel based on the received UL reference signal. That is, the gNB 110 estimates downlink channel spatial and frequency domain supports from the received uplink reference signals (one or more). For FDD, reciprocity is partial and may hold for angles and delays. In an embodiment, the estimations may be for each channel transmission rank, in case the communication channel has rank >1.

There is correspondence between delays and so-called "frequency-domain components" in Rel-16 Type II codebooks. Both quantities may be defined in a DFT-transformed domain with respect to subcarrier domain where both SRS and CSI-RS are defined. The "frequency domain components", also called "frequency domain supports" or "frequency domain basis vectors" are a set of vectors that are selected from a DFT basis. They indicate the location of the channel taps in the time domain, given the duality between frequency and time domains.

In an embodiment, determining the delay information is based on channel reciprocity. In an embodiment, the delay information indicates a delay for each path of the communication channel with respect to a reference time. The reference time may be the delay of the line-of-sight path. In an embodiment, the number of paths taken into account is capped by a predetermined power threshold. Due to duality of the time and frequency, the gNB 110 may estimate channel frequency response (CFR) from the received SRS, in order to obtain the delay information.

In an embodiment, the spatial information indicates an angle-of-arrival for each path of the communication channel with respect to a reference angle. The reference angle may be a zero angle, for example. In practice, which physical direction this 0-angle corresponds to may be determined by the gNB's reference system and it could be a given a certain direction in azimuth and/or elevation. The spatial information may be determined e.g. based on angle-of-arrival information of the received UL SRS.

In step 304, the gNB 110 may apply both the delay information and the spatial information in precoding of at least one DL reference signal. In an embodiment, the at least one downlink reference signal comprises a channel state information reference signal (CSI-RS). In an embodiment, the at least one downlink reference signal comprises another reference signal than CSI-RS, such as demodulation reference signal (DMRS). By precoding it may be understood that certain type of information is added to the CSI-RS signal comprising one or more PRB resource-elements. By use of the delay information for the precoding, the DL reference signal precoding at the gNB side is different from that used for LTE class B CSI and Rel-15/Rel-16 type II port selection codebook. This step entails application of both spatial and delay information in the downlink reference signal precoding. The precoders for the downlink reference signals will be based on both spatial domain beams (e.g. selected from an oversampled grid of beams) and frequency domain components (e.g. selected from a codebook, typically DFT/IDFT based, that may be oversampled). The frequency domain components, corresponding to the delay information due to time-frequency duality, may be determined in step 302 based on the received UL SRS. Spatial precoding may comprise transmitting a CSI-RS symbol through a number of antenna ports with a given complex multiplicative factor (the set of these factors forming a precoding vector). The proposed "FD precoding", also known as "delay precoding", may be defined as applying given complex multiplicative factors to the spatial precoding vectors for different frequency units (such as PRBs), as in FIG. 2A for example. Thus, in an embodiment, the precoding comprises applying for each DL reference signal, comprising one or more resource elements of the PRB, a frequency-domain precoder that is based on a combination of one spatial beam with at least one phase ramp in frequency, each phase ramp corresponding to one component of the corresponding delay profile of the communication channel. The phase ramps in frequency correspond to components of the time-domain support of the channel, based on the frequency-time duality.

In an embodiment, the processing (e.g. the FD precoding) of the CSI-RS signals/ports is done before IFFT of the transmitter (i.e. in frequency domain). In this context, the to-be-beamformed CSI-RS ports (i.e. CSI-RS signals) are windowed M times, where M denotes the number of FD components. The goal of this operation may be to enable the UE 120 to estimate linear combination non-zero coefficients by a summation of the beamformed CSI-RS over the configured subbands for every AP. For example, in the example embodiment of FIG. 2A, the UE 120 may sum the $S_{CSI-RS, 0}$ (i.e. channel estimates) over all PRBs in many subbands to reach one $S_{CSI-RS, 0}$ for that spatial beam, as will be described. One subband may comprise e.g. multiple PRBs.

In step 306, the gNB 110 may transmit the at least one precoded DL reference signal to the UE 120. The gNB 110 may e.g. beamform each CSI-RS port (also called CSI-RS signal) with the above-mentioned frequency-domain precoder. There may be one or more DL reference signals (e.g. CSI-RSs). With spatial precoding only (as in Rel-16 type II port selection), the gNB 110 sends one CSI-RS per one spatial beam, and this may be called a CSI-RS port. After applying the "delay precoding" of step 304, the gNB 110 may in step 306 send a multiplicity of CSI-RSs for each spatial beam, like in FIG. 2A where there are M=3 FD components for each spatial beam, and thus three CSI-RSs for one spatial beam. In an embodiment, the gNB 110 transmits the precoded CSI-RS ports in each of the configured subbands. The subbands may be preconfigured to the UE 120 by the gNB 110 beforehand and/or depend on the capabilities of the UE 120.

In an embodiment, after reception of the uplink reference signal, the gNB 110 may estimate a set of beams that span the UE channel in the spatial domain. This set of beams may be used to beamform the DL reference signals.

In an embodiment, the gNB 110 may transmit, to the UE 120, an indication indicating whether the delay and the spatial information is used for precoding of the DL reference signal at the gNB 110. This way, the UE 120 may know beforehand how the CSI-RS is precoded at the gNB side. For example, the UE 120 may be configured, e.g. by the gNB 110, with aperiodic CSI trigger state list and/or semi-persistent CSI trigger state list. Each trigger state may be associated with a CSI reporting configuration set that includes information/fields related to partial-reciprocity operations. Information/fields related to partial-reciprocity may include explicit or implicit indication (e.g. number of CSI-RS ports) on the DL reference signal precoding, specifying if spatial domain, frequency domain or a combination of the two is used at the gNB side.

In an embodiment, the UE 120, after receiving the indication (e.g. over RRC signaling), may understand that the pilots have been windowed already by the phase ramps. This may be why a simple summation (dot product operation) may be sufficient at the UE. If the pilots are not windowed, and the UE 120 still performs the summation, then it will not provide the right feedback.

In an embodiment, this precoded DL reference signal may enable the UE 120 to estimate channel coefficients for each subband configured for the UE 120, wherein the estimation may be based on the received at least one precoded DL reference signal, and further to perform summation of the estimated channel coefficients over the subbands, in order to derive non-zero coefficients in the frequency domain. For example, upon reception of the beamformed DL reference signal(s) (that are precoded in spatial and frequency domains), the UE 120 may process the measured channel coefficients of the received signal through a summation over all configured sub bands (the sum may be weighted) in order to derive the at least one non-zero coefficient. In an embodiment, the gNB 110 may configure the resolution of the window, e.g. the gNB 110 may in a certain configuration set all the weights given to the $S_{CSI-RS}$ within one subband to the same value. In another embodiment, the weighting may be different such that e.g. the weights given to the $S_{CSI-RS}$ within one subband may have different values.

In step 308, the gNB 110 may receive, from the UE 120 as a response to the transmission of the at least one precoded DL reference signal, channel information indicating the at least one non-zero channel coefficients of/for at least one channel transmission layer between the UE 120 and the gNB 110. There may be many channel layers, each characterized with a respective channel matrix, for channels with a rank above 1. Thus, the UE 120 may feedback the channel coefficients for each transmission layer. In an embodiment, the channel information comprises channel state information (CSI). In an embodiment, the channel information comprises a precoding matrix indicator (PMI). In an embodiment, the channel information is quantized by the UE 120. The fed back channel information may indicate the channel coefficients of the DL channel matrix explicitly or implicitly. In an embodiment, the channel information may comprise the channel coefficients in frequency domain. In an embodiment, the channel information may comprise the channel coefficients in time domain, instead of frequency domain. However, these time domain coefficients may be seen to convey the coefficients in FD, via an appropriate transformation, and vice versa.

In an embodiment, the non-zero coefficients in the frequency domain indicate non-zero coefficients per each spatial beam and per each frequency domain component or a group of frequency domain components of the communication channel. Regarding these domains, it may be noted that e.g. in FIG. 2A, each group of two-squares represents two SD beams and one FD component. In Rel-16 type II codebook, such components were used for PMI frequency domain compression by the UE. However, in the proposed solution, the compression need not take place by the UE 120, but by the gNB 110 in the precoding of the CSI-RS in step 304. In an embodiment, for PMI feedback purpose, the UE may transmit only non-zero coefficients per CSI-RS port.

In an embodiment, the UE 120 may refrain from sending, and thus the channel information may not comprise, information indicating non-zero coefficients for any sub-band separately. That is, the UE 120 may not feedback a frequency basis subset $W_f$, contrary to Rel-16 type II codebook solution. Instead, the UE 120 may perform summing of the estimated channel coefficients over the subbands. In Rel-16 type II precoding, it is up to the UE to find the relevant FD components and to feed their indices back to the gNB as part of the UCI. Owing to the current proposal, this is no longer necessary as the gNB 110 is the one estimating the frequency domain components based on the UL SRS, as said in connection of step 302. Since these components are used in the precoding of DL reference signal(s) in step 304, it is no longer necessary for the UE 120 to know the actual components or to feed them back. Indeed, when applying the proposed "FD precoding" (also known as "delay precoding") of step 304 to the CSI-RS ports/signals, the UE 120 may still report the non-zero coefficients per FD component, but it does so blindly, i.e. without knowledge of which FD component a coefficient corresponds to. This information is known by the gNB 110 and the gNB 110 determines the set of weights applied throughout the PRBs to the corresponding spatial beam.

The operation of summing may be possible because of the windowing of the CSI-RSs which was applied beforehand at gNB side. The windowing, by use of the phase ramps, shifts the channel impulse response (CIR) as seen by the receiver (e.g. the UE 120) such that a delay tap corresponding to FD component m (where m<M) occurs at the $0^{th}$ position (DC) of the CIR. The DC component can be obtained by summing. The summing may in an embodiment be extended to averaging. In an embodiment, prior to quantization, all FD coefficients are normalized by the strongest such that the strongest has value 1. The gNB 110 knows which phase ramp corresponding to which FD component the gNB 110 used for the precoding. Therefore, the gNB 110 may be able to determine the location of the complex FD component coefficient fed back by the UE 120. In an embodiment, the channel information does not comprise a bitmap $M_{INITIAL}$ indicating locations of the non-zero coefficients within a precoding matrix indicator (PMI).

As such, in an embodiment, a modification of the uplink control information format carrying the CSI takes place. Since delay(s) and angles(s) reciprocity are both included in the precoding of downlink reference signals, the UE 120 is spared the need to feedback a frequency domain subset. Additionally, the UE 120 may also drop further fields from previous Rel-16 type II feedback, for example, the bitmap indicating the location of the non-zero coefficients.

As a result of receiving such CSI from the UE 120, the gNB 110 may in step 310 recreate/determine a precoder matrix and/or a downlink (space-time-frequency) channel matrix needed for beamforming a data transmission to the UE 120. In an embodiment, the recreated channel may be depicted by the precoder matrix of the communication channel, the matrix indicating space-time-frequency components of the communication channel. Based on one definition of CSI, the UE 120 may report a precoder matrix indicator (PMI), which the gNB 110 may use to reconstruct the precoder matrix. However, in another embodiment, the UE 120 may report an explicit channel to the gNB 110. This may mean that the UE 120 feeds back the compressed channel coefficients of the downlink space-time-frequency channel matrix. The determination of the matrix in step 310 may be based on the knowledge of the space-delay basis components ($W_1$ and $W_f$) from the UL SRS of step 302, and further on the fed-back scaling factors (=CSI), such as W2, for each of the space-delay basis components of step 308. The gNB 110 may then apply beamforming for data transmission to the UE 120 based on either or both of the matrices.

From the point of view of the UE 120, the method is depicted in FIG. 4. In step 400, the UE 120 may transmit the UL reference signal to the gNB 110, wherein the UL reference signal indicates the above-mentioned delay information and spatial information of the communication channel between the UE 120 and the gNB 110. In step 402, the UE 120 may receive, as a response to transmitting the UL reference signal, the at least one DL reference signal, wherein the at least one downlink reference signal is precoded at the gNB 110 at least based on the delay information and the spatial information. In step 404, the UE 120 may determine channel information based on the received at least one precoded DL reference signal, the channel information indicating at least non-zero coefficients of/for at least one channel transmission layer, and in step 406 transmit the channel information to the gNB 110.

As said, the determining/estimating of the channel information by the UE 120 in step 404 may comprise estimating channel coefficients for each subband configured for the user equipment, wherein the estimating may be based on the at least one precoded downlink reference signal, and summing the estimated channel coefficients over the subbands. In this way, the UE 120 may compute scaling factors for each of the space-delay basis components from the precoded CSI-RS, and then feedback the scaling factors, without explicitly indicating delay basis components.

The proposed solution for reciprocity-based CSI measurements and reporting may reduce the size of uplink control information (UCI in 5G NR), without compromising the PMI accuracy. The proposed methods may reduce the computational strain on the UE 120 when measuring and reporting the CSI because CSI compression operations may advantageously be offloaded from the UE 120 to the gNB 110. For example, in Rel-16 Type II, the space-delay basis components and corresponding scale factors are computed by the UE 120 and fed back on the UL. In Rel-16 Type II port selection, the delay basis components and the corresponding scaling factors are computed by the UE and fed back on the UL. Owing to the embodiments of the current proposals, the space-delay basis components are computed by the gNB 110 and the corresponding scale factors are computed and fed back by the UE 120. For example, the weight and sum operations inherent to the FD compression are decoupled/distributed between the gNB 110 and the UE 120, respectively, instead of performing both operations at the UE 120. Any possible increase of DL resource overhead due to the additional precoding may be controlled e.g. by assuming lower CSI-RS density factors, e.g., transmit pilots (CSI-RSs) every $2^{nd}$ or $3^{rd}$ PRBs, for example. Also it may be noted that UL resources are scarcer than their DL counterparts. Thus, it may be beneficial to reduce UL resource usage with the expense of slightly increased DL usage.

Let us next look at the precoding in more details. Starting with a case of one antenna port, a UE with one receive antenna, assuming $n_{PRB}$ PRBs, and assuming the gNB has knowledge of $W_f^H$ on the DL from UL SRS measurements. The effective compressed explicit channel on the DL can be written as:

$$H_{\mathit{eff}1 \times M} = H_{1 \times n_{PRB}} W_{f_{n_{PRB} \times M}}^H = H_{1 \times n_{PRB}} \left[ W_{n_{PRB} \times 1}^{f 0^*} \cdots W_{n_{PRB} \times 1}^{f M-1^*} \right]$$

Assuming a CSI-RS density of 1, the received signal can then be written as:

$$R_{n_{PRB} \times 1} = \breve{H}_{n_{PRB} \times n_{PRB}} \begin{bmatrix} S_0 \\ \vdots \\ S_{n_{PRB}-1} \end{bmatrix}$$

$$\text{Where } \breve{H}_{n_{PRB} \times n_{PRB}} = \mathrm{diag}(H_{1 \times n_{PRB}}) = \begin{bmatrix} H(0) & & \\ & \ddots & \\ & & H(n_{PRB}-1) \end{bmatrix}$$

And $S_x$ is the transmitted pilot (e.g. CSI-RS) on PRB x.

Considering one column inside $W_f^H$, for example column m $W_{n_{PRB} \times 1}^{fm*}$ if the pilot sequence is windowed by that column, the received signal can be written as:

$$R_{n_{PRB} \times 1} = \breve{H}_{n_{PRB} \times n_{PRB}} \breve{W}_{n_{PRB} \times n_{PRB}}^{fm*} S_m$$

Where $\breve{W}_{n_{PRB} \times n_{PRB}}^{fm*} = $ $$\mathrm{diag}(W^{fm*}) = \begin{bmatrix} W^{fm*}(0) & & \\ & \ddots & \\ & & W^{fm*}(n_{PRB}-1) \end{bmatrix}_{n_{PRB} \times n_{PRB}}$$

And $S = \begin{bmatrix} S_0^m \\ & \ddots \\ & & S_{n_{PRB}-1}^m \end{bmatrix}$, such that $\breve{W}_{n_{PRB} \times n_{PRB}}^{fm*} S_m$ is the transmitted pilot sequence after the FD precoding has been applied, which comprises multiplying with a diagonal matrix. This multiplies every pilot by one scalar number, i.e. performs the windowing.

At the UE side, an inner product between the received signal and the pilot sequence yields:

$$S_m^H R_{n_{PRB} \times 1} = S_m^H \breve{H}_{n_{PRB} \times n_{PRB}} \breve{W}_{n_{PRB} \times n_{PRB}}^{fm*} S_m$$

$$S_m^H R_{n_{PRB} \times 1} =$$

$$\sum \mathrm{diag}\left(\breve{H}_{n_{PRB} \times n_{PRB}} \breve{W}_{n_{PRB} \times n_{PRB}}^{fm*}\right) = H_{1 \times n_{PRB}} W_{n_{PRB} \times 1}^{fm*} = H_{\mathit{eff}_{1 \times M}}(m)$$

Therefore, with a simple dot product at UE side, UE can feedback the compressed channel for delay m. This operation may be repeated M times to recover the whole compressed channel $H_{\mathit{eff}_{1 \times M}}$ In a next step after building $H_{\mathit{eff}_{1 \times M}}$ at gNB side, the gNB may reconstruct the whole CSI by $$H_{1 \times n_{PRB}} = H_{\mathit{eff}_{1 \times M}} W_{f_{M \times n_{PRB}}}$$

In order to avoid excessive usage of resources on DL, a plurality of solutions are available alone or in combination. For example:

Keeping a total CSI-RS density=1. For example, assuming a case of M=4 and CSI-RS density % A per a delay tap, one column m inside $W_f^H$, $W_{n_{PRB} \times 1}^{fm*}$ windows the pilot sequence every 4 PRBs. In this case, the DFT size may also be decreased accordingly.

Several CSI-RS transmissions in different points of time can be used to get the whole $H_{\mathit{eff}_{1 \times M}}$.

If $W_f$ can be applied differently per antenna port, then not all channel tap delays need to be probed per antenna port. In other words, even though M=4 channel taps are active on all paths, only the strongest $M_n < M$ tap delays need to be reported per antenna port n which reduces the number of resources needed in DL.

When extending the above model to a multi-port case, e.g. in a case with $N_t$ ports for 1 PRB (e.g. at PRB x), the beamformed CSI-RS can be written as:

$$R_{1 \times N_t}(x) =$$

$$[H(0) \ \ldots \ H(N_t-1)] \begin{bmatrix} W^{fm*}(x) & & \\ & \ddots & \\ & & W^{fm*}(x) \end{bmatrix}_{N_t \times N_t} S_{B_{N_t \times N_t}}$$

For $N_3$ PRBs, the received signal can be written as:

$$R_{1 \times N_t n_{PRB}} =$$

$$H_{1 \times N_t n_{PRB}} \begin{bmatrix} W^{fm*}(0) I_{N_t} & & \\ & \ddots & \\ & & W^{fm*}(n_{PRB}-1) I_{N_t} \end{bmatrix}_{N_t n_{PRB} \times N_t n_{PRB}}$$

$$\begin{bmatrix} S_{B_{N_t \times N_t}} & & \\ & \ddots & \\ & & S_{B_{N_t \times N_t}} \end{bmatrix}_{N_t n_{PRB} \times N_t n_{PRB}}$$

$$R_{1 \times N_t n_{PRB}} =$$

$$H_{1 \times N_t n_{PRB}} \left( \breve{W}_{n_{PRB} \times n_{PRB}}^{fm*} \otimes I_{N_t} \right) \begin{bmatrix} S_{B_{N_t \times N_t}} & & \\ & \ddots & \\ & & S_{B_{N_t \times N_t}} \end{bmatrix}_{N_t n_{PRB} \times N_t n_{PRB}}$$

$$R_{1 \times N_t n_{PRB}} =$$

$$H_{1 \times N_t n_{PRB}} \overline{(W^{fm})}_{N_t n_{PRB} \times N_t n_{PRB}} \begin{bmatrix} S_{B_{N_t \times N_t}} & & \\ & \ddots & \\ & & S_{B_{N_t \times N_t}} \end{bmatrix}_{N_t n_{PRB} \times N_t n_{PRB}}$$

where $\overline{W^{fm}} = \breve{W}_{n_{PRB} \times n_{PRB}}^{fm*} \otimes I_{N_t}$ At the UE side, the inner product between the received signal and the pilot sequence, as written out above, which is done for every tap delay m, is then carried out for every transmit antenna port.

As said, frequency windowing may be used. For example, in case $N_t$ TXRUs are going to be spatially beamformed into $N_k$ CSI ports, $$\overline{W^{fm}} = \breve{W}_{n_{PRB} \times n_{PRB}}^{fm*} \otimes I_{N_k}$$

And the received signal can be written as $$R_{1 \times N_t n_{PRB}} = H_{1 \times N_t n_{PRB}} \overline{W}_{1 N_t n_{PRB} \times N_k n_{PRB}}$$

$$\overline{W}_{N_k n_{PRB} \times N_k n_{PRB}}^{fm} \begin{bmatrix} S_{B_{N_k \times N_k}} & & \\ & \ddots & \\ & & S_{B_{N_k \times N_k}} \end{bmatrix}_{N_k n_{PRB} \times N_k n_{PRB}}$$

It is also possible to extend the analysis for a UE with $N_{rx} > 1$ receive antennas, where the effective channel per transmit antenna port is of a following size $$H_{\mathit{eff}_{N_{rx} \times M}} = H_{N_{rx} \times n_{PRB}} W_{f_{n_{PRB} \times M}}^H = H_{N_{rx} \times n_{PRB}} \left[ W_{n_{PRB} \times 1}^{f0*} \ \ldots \ W_{n_{PRB} \times 1}^{fM-1*} \right]$$

In such case, the UE is going to repeat the inner product between the received signal and the pilot sequence, as written out above, for every receive UE antenna and transmit gNB antenna port.

In order to account for the fact that only part of the channel bandwidth is active, the effective channel may be weighed by a correction matrix at the gNB side $$\tilde{H}_{eff_{1\times M}} = H_{eff_{1\times M}} \left( W_{f_{M\times n_{PRB}}} W_{f_{n_{PRB}\times M}}^H \right)^{-1}$$

Figure 5:
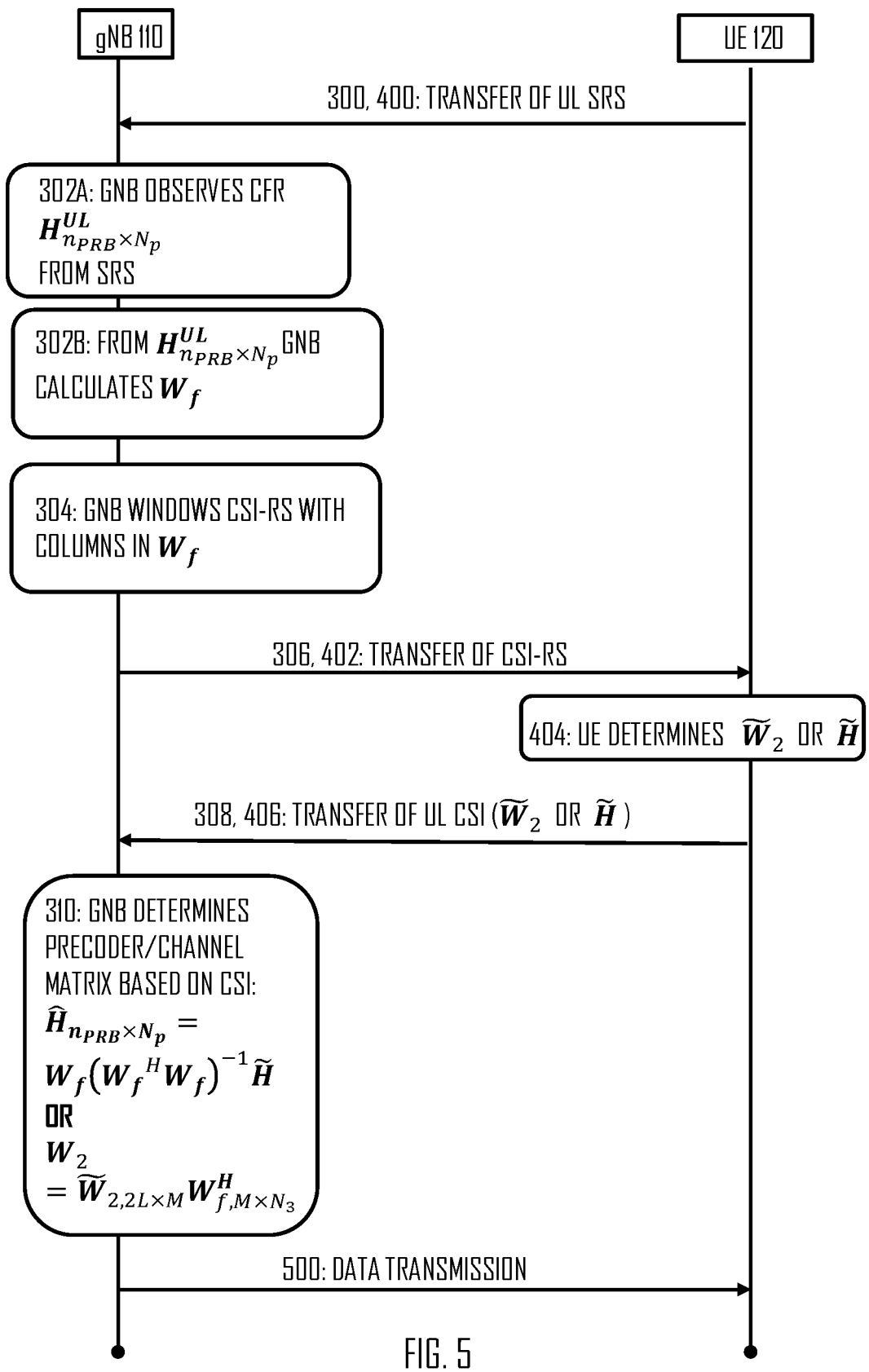
FIG. 5 illustrates a signaling flow diagram, according to an embodiment.

FIG. 5 shows an embodiment for the method of precoding and reporting. FIG. 5 shows, for each of the steps of FIGS. 3 and 4, one possible embodiment for carrying out the respective step. In step 300, 400, the SRS is transferred from the UE 120 to the gNB 110. In step 302A and 302B, the gNB 110 observes the delay information in the form of channel frequency response (CFR). Parameter Np is the number of SD paths, which equals ($2L \times N_{rx}$). From this the gNB 110 may determine the frequency domain components $W_f$ which the gNB may use in step 304 to window the CSI-RS. The CSI-RS is transferred to the UE 120 in step 306, 402. In step 404, the UE 120 then determines, from the CSI-RS, the non-zero channel coefficients of/for at least one transmission layer. These may be called scaling factors for space-delay basis components, and labelled $W_2$. Alternatively, the UE 120 may compute a channel matrix H. Either or both of these are then feedback to the gNB in step 308, 406, possibly for each transmission layer/channel matrix (in case of channel rank >1). In step 310, the gNB 110 estimates CSI (e.g. CFR) to determine the precoder matrix and/or channel matrix for use in data transmission. If needed, the precoding of the CSI-RS, transmission of the CSI-RS and the feedback of $W_2$ and/or H may be repeated M times to recover the whole space-time-frequency channel. The determined precoder matrix may then be used for beamforming data from the gNB to the UE in step 500.

When compared to the Rel 16 solution, the following can be noted. The aim of the FD compression in Rel.16 was to reduce the overhead inside the subband eigenvector matrix $W_2$. This compression was achieved by multiplying matrix $W_2$ with a compression matrix $W_f$ and by selecting a subset of the coefficients of the matrix obtained as the result of the compression. Overall, the final structure of the PMI would then be given by the multiplication of the following three matrices:

A matrix $W_1$, responsible for the spatial compression
A matrix $W_2$ carrying the selected compressed coefficients
A matrix $W_f$, responsible for the frequency domain (FD) compression Two versions of the type-II codebook are supported in Rel-16, i.e.:

"enhanced": in this case all the computational burden is on the UE which needs to identify and apply $W_1$, $W_f$ and calculate $W_2$, and then feedback indicators carrying quantized information about the three matrices. The resulting overhead can be large.

"enhanced port selection": in this case, CSI-RS ports are beamformed at gNB in order to pre-selected preferred spatial direction for the transmission to the UE. Accordingly, UE does not need to identify and apply the matrix W1, since no spatial compression needs to be performed in this case. Only $W_f$ is identified and applied to calculate $W_2$. Only indicators carrying quantized information about these two matrices are fed back to gNB. This results in a lower computational burden for the UE and smaller overhead as well.

In the current proposal, a further step forward is taken by proposing to leave the task of identifying, and partially applying, $W_f$ to the gNB. In this context, the base station makes use of the information which can be obtained by evaluating received SRS in the UL, i.e., knowledge of delay(s) and angle(s) of UL channels, to further process the CSI-RS ports and window them before the DL transmission. Accordingly, a sum operation is sufficient at the UE, thanks to the proposed approach, in order to obtain a set of compressed coefficients after the channel estimation. The task of finding $W_f$ is often a complex and long procedure, which hinders the practical feasibility of Rel-16 type II port selection codebook for lower-end UEs. By shifting this complex part to the gNB, lower computational and memory requirements are imposed to the UE. Therefore, the signalling of the indicator conveying information on the structure of $W_f$ is not necessary anymore, since the choice of FD components is performed by gNB independently of the PMI feedback. In other words, the feedback overhead according to the proposed idea need not include information on the FD compression, differently from its Rel-16 counterpart.

Let us next look at some embodiments for improving the accuracy and knowledge of $W_f$.

In type II codebook, the precoding matrix, per layer, may be written as $$W = W_1 W_2 \qquad (1)$$

The final precoder at the gNB may be a weighted linear combination of L orthogonal beams per polarization as $$\tilde{w}_{r,l} = \sum_{i=0}^{L-1} \underbrace{b_{k_1^{(i)} k_2^{(i)}}}_{\text{Long-term 2D DFT beam}} \cdot \underbrace{p_{r,l,i}^{(WB)}}_{\text{Beam power scaling factor wideband}}$$

$$\underbrace{p_{r,l,i}^{(SB)}}_{\text{Beam power scaling factor subband}} \cdot \underbrace{c_{r,l,i}}_{\text{Beam combining coeff.}}$$

Where the grid-of-beam matrix $W_1$ is of size $2N_1N_2 \times 2L$ and is built out of L orthogonal vectors/beams per polarization r from a set of oversampled $O_1 O_2 N_1 N_2$ DFT beams, where $N_1$ and $N_2$ are the number of antenna ports in horizontal and vertical domains. $O_1$ and $O_2$ are the oversampling factors in both dimensions. 'l' refer to the index of the transmission layer. This collection of vectors can be used to approximate the eigenvectors of the channel covariance matrix by means of suitable weighted linear combinations. This operation achieves a compression in the spatial domain (SD), hence the resulting 2L beams are also referred to as SD components.

Linear combination subband matrix $W_2$ of size $2L \times N_3$, where $N_3$ is the number of frequency subbands, which is used for the weighed linear combination of the columns of $W_1$ yielding the aforementioned approximation of the l strongest eigenvectors of the channel covariance matrix.

Enhancement of Type II CSI feedback for Rel. 16 may be based on exploiting the frequency correlation inside $W_2$. A frequency domain compression scheme is applied on subband matrix $W_2$. The precoder for each layer and across frequency-domain units W is derived as follows $$W = W_1 \tilde{W}_2 W_f^H \qquad (2)$$

Where $\tilde{W}_2$ is a $2L \times M$ matrix of linear combining coefficients, $W_f$ is an $N_3 \times M$ FD compression matrix (analogous to $W_1$ in frequency domain), where M is the number of frequency domain (FD) components.

For example, in Rel.16 type II CSI, the UE may feedback to the gNB: Grid-of-beam matrix $W_1$, FD basis subset $W_f$, and linear combination coefficients (LCC) $\tilde{W}_2$. At the UE side, $\tilde{W}_2$ can be computed as $$\tilde{W}_2 = W_2 W_f \quad (3)$$

As said, type II port selection enhancements may take into consideration uplink and downlink channel partial reciprocity in terms of both delay(s) and angle(s). For example, a CSI scheme may be used in which the partial reciprocity of the delay information was exploited to reduce the complexity at the UE side, as described above e.g. in connection of FIGS. 2-5. Let us call this proposal as a CSI scheme #A. This may assume existing knowledge of the delay information on DL (i.e. knowledge of $W_f$) at gNB side and may be comprised of at least the following: at gNB side, the CSI-RSs are pre-coded with $W_f$, by windowing the CSI-RSs with phase ramps corresponding to each significant delay tap on the DL, i.e. with the columns in $W_f$. At the UE side, it may be that the inner product of received signal on the different frequency subbands with the known pilot sequence(s) (CSI-RS) yields $\tilde{W}_2$, which is then fed back by the UE. Hence the UE may be spared from the effort of calculating the eigenvectors and the DFT compression as required in Rel.16.

However, the CSI scheme #A assumes the gNB has sufficiently good (e.g. full) knowledge of $W_f$ (for example from measurements made on uplink reference signals, e.g. SRS). In reality, errors in estimating reciprocal channel information may still occur, especially for weaker paths or delays which can be problematic, as the gNB will subsequently use erroneous information in the windowing of (i.e. precoding) of DL CSI-RSs.

In type II port selection CB, compared with the Type II CB, the selected spatial beam matrix $W_1$ is replaced with a port selection matrix indicating the selected ports. It has been agreed that the same DFT-based compression scheme in Rel.16 may be extended to the Type II port selection codebook. Thus, when feeding back $W_1$, the UE may only need to feedback the indices of the selected port selection, instead of feeding back the indices of strongest beams from a fixed DFT based codebook. An example of $W_1$ with L=4 is depicted as follows:

$$W_1 = \begin{bmatrix} e_1, e_2, e_3, e_4 & 0 \\ 0 & e_1, e_2, e_3, e_4 \end{bmatrix} \quad (4)$$

where $e_i = [0, 0, \ldots, 1, \ldots, 0, 0]^T$ is a port selection vector whose i-th element is 1 and remaining elements are 0. Note that the UE may be constrained to select L consecutive ports out of all the ports in the CSI-RS.

The advantage may be that the gNB can exploit any prior knowledge it has on the DL spatial wideband CSI (for example from measurements made on uplink reference signals, such as on SRS) such that the set of ports the UE is selecting from does not span the whole angular range, thus potentially reducing the amount of UL overhead needed or increasing the granularity of $W_1$. As we can see, the port selection CB only assumed pre-existing knowledge of spatial information at gNB.

In equation (3) each element inside $\tilde{W}_2$ can be computed as a weight and sum operation between one row (SD beam) in $W_2$ and one column (phase ramp corresponding to location of dominant tap) inside $W_f$ $$\tilde{W}_2(l,m) = \sum_{s=0}^{N3-1} W_2(l,s) W_f(s,m) \quad (5)$$

In CSI scheme #A, assuming knowledge of $W_f$ at gNB, the gNB applies for every SD beam M windowing operations on M CSI-RSs with different M columns of $W_f$. FIG. 2A depicts an example of resource block (RB) pilot format intended to be precoded with M=3 FD components (comprising $W_f^0$, $W_f^1$ and $W_f^2$) and four SD beams within each FD component. The vertical dimension depicts 12 subcarriers in frequency while the horizontal dimensions is for OFDM symbols in time.

Before looking this deeper, it may be helpful to first review the pilot formats used for traditional LTE/NR CSI-RS transmission. In a typical LTE/NR RB pilot format, two adjacent-in-time pilot resource elements (REs) would carry two pilot symbols that are transmitted with code division multiplexing (CDM). In FIG. 2A these would comprise e.g. $S_{CSI-RS,0}$ and $S_{CSI-RS,1}$. The RB shown in FIG. 2A contains four RE locations per FD component, and therefore carries four pilot symbols per one FD component, where each pilot symbol is associated with a "CSI-RS port", e.g. with a SD beam. Typically, as with the typical LTE/NR CSI-RS formats, there would be some number of these RBs transmitted across the frequency band, and each "CSI-RS port" has an associated sequence of pilot symbols, one pilot symbol per RB across the frequency band for that "CSI-RS port". Within an RB, for each pair of adjacent REs, the UE would undo the CDM and take the resulting two symbols and obtain a "noisy" channel estimate for the two CSI-RS ports associated with that pair of adjacent REs. Then, the noisy channel estimates for each CSI-RS port across all the RBs can be filtered/smoothed out to obtain an estimated frequency response of that CSI-RS port. This type of channel estimation is commonly used for legacy LTE/NR CSI-RS channel estimation.

According to the CSI scheme #A, partially depicted in FIG. 2A, each CSI-RS port is precoded with a combination of an SD beam and an FD component, such that we end up with 2LM virtual CSI-ports, where 2L is the number of SD beams and M is the number of FD components. In this way, each virtual CSI port may be the result of a pilot symbol first precoded with an SD beam and then with an FD component (i.e., with a phase ramp corresponding to the delay of the FD component), and the resulting symbols may be encoded according to the methodology described in the previous paragraph. In some embodiment of CSI scheme #A, the SD precoding is optional, meaning that the scheme may also work with FD precoding only. In FIG. 2A, we have an example where the differently marked blocks refer to different FD components. For each marked block, there are four pilot symbols multiplexed, each corresponding to a different SD beam. The gNB may send the depicted PRB carrying at least these CSI-RSs in DL. The gNB may send another PRB with another set of CSI-RSs, based on same or different $W_1$ and $W_f$, to another spatial direction and/or to another UE. The UE may receive these downlink reference signals. The UE's task may be to estimate the effective channel frequency response for each CSI-RS port, where that effective channel frequency response is the combination of the FD and SD components associated with that CSI-RS port and the multipath channel. Note that in the example of FIG. 2A, 12 pilot resource elements are used to enable the gNB to transmit M=3 windowed 4-port CSI-RS, in other words there are 12 virtual CSI-ports for 4 SD components×3 FD components.

At the UE side, for every virtual CSI-RS port (i.e., CSI-RS pilot sequence and corresponding pilot REs in the RBs across the band), the UE may estimate the channel response by computing the complex channel gains, as explained earlier. The complex channel gains for a virtual CSI-RS port may further be averaged across the FD subbands. In this way, for each virtual CSI-RS port, the UE may compute the average of the channel gain/phase response across the FD subbands. This may provide the UE with the values of the compressed channel components. This may mean that the weight and sum operation for computing the compressed channel component may be advantageously divided between the gNB and the UE, where the weighting (windowing) is carried out at the gNB side and the summation is made at the UE side. This may be in contrast to the standard scheme in the Rel-16 Type II codebook where the whole weight and sum operation is done at the UE side.

However, as said, CSI scheme #A, or any other use case utilizing the knowledge of $W_f$ at the gNB side based on partial reciprocity, may benefit from accurate knowledge of $W_f$. Thus, there are needs to provide mechanisms in which a pre-knowledge of $W_f$ from partial reciprocity at gNB side can be further refined or updated to avoid measurement errors at gNB side.

To at least partially tackle this problem, there is proposed a solution for a delay sweeping, for the gNB to refine its existing knowledge of the delay information related to the DL channel, which may be obtained from UL SRS measurements, in order to have a more accurate knowledge of $W_f$. This may improve the accuracy of the estimated $W_f$ and consequently any subsequent use case in which it is utilized, such as for CSI scheme #A. Thus, one advantage may be that, similar to the case of port selection CB, the gNB may exploit any prior knowledge it has on the DL delay information such that the set of delays the UE is selecting from does not span the whole delay range, thus potentially reducing the amount of UL overhead needed or increasing the granularity of $W_f$.

Figure 8:
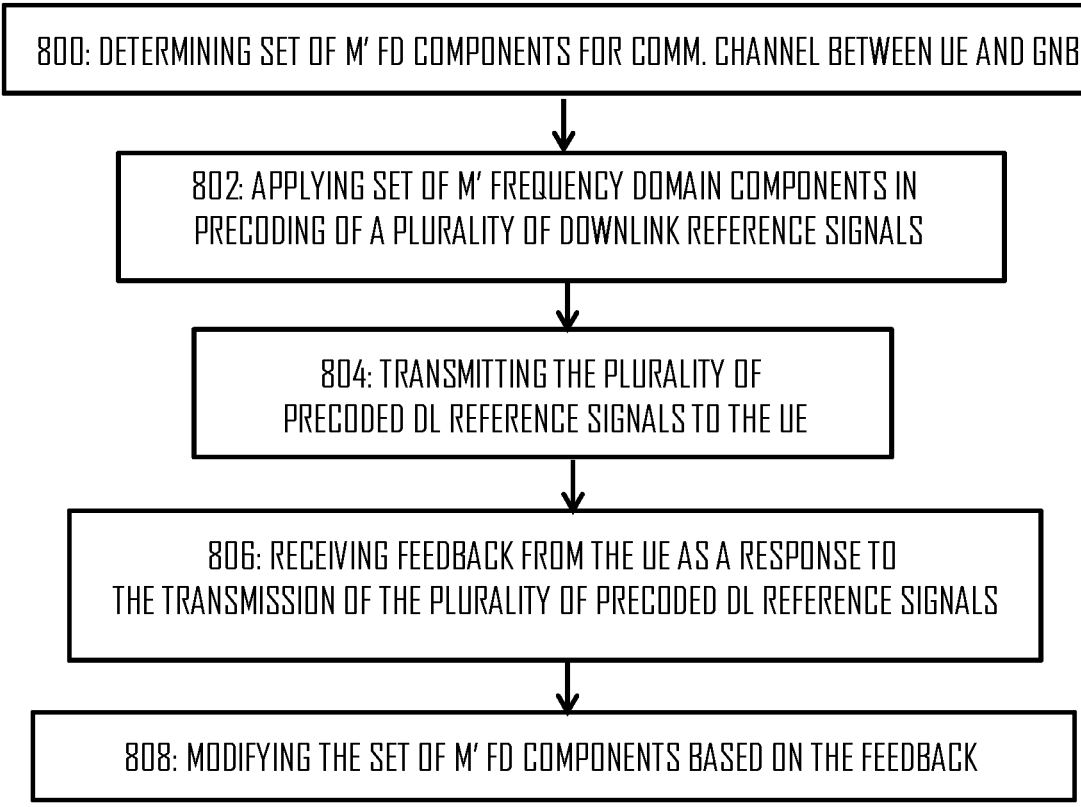

FIG. 8 depicts an example method. The method may be performed by a network node, such as the gNB 110 of FIG. 1. For the sake of simplicity, let us assume that the method is performed by the gNB 110. Accordingly, as shown in FIG. 8, the gNB 110 may in step 800 determine a set of M' frequency domain components for a communication channel between a user equipment and a network node. In an embodiment, M' is a positive integer.

In an embodiment, the M' is derived by the gNB 110 based on measurements performed for a received uplink reference signal, such as sounding reference signal. However, other uplink reference signals may be used instead, such as uplink DMRS. In an embodiment, the UE 120 transmits periodic, aperiodic or semi-persistent uplink reference signal(s) to the gNB 110. The gNB 110 may, for example, estimate based on the UL RS delay information regarding a delay profile of the communication channel between the UE 120 and the gNB 110. In an embodiment, the knowledge of M' FD components may be based on $W_f$ that has been obtained based on earlier UE feedback.

In an embodiment, determining the delay information is based on channel reciprocity. Based on this delay information, the gNB 110 may thus determine the set of M' frequency domain components.

In an embodiment, the gNB 110 may further determine a set of 2L spatial domain components for the communication channel. In an embodiment, 2L is a positive integer. In an embodiment, the gNB 110 may estimate spatial information regarding the communication channel based on the received uplink reference signal and then determine the set of 2L spatial domain components based on the spatial information. The spatial information may be determined e.g. based on angle-of-arrival information of the received UL SRS.

In an embodiment, the gNB 110 may select L' spatial domain components amongst the 2L spatial domain components, where L'<=2L. In an embodiment, the L' spatial domain components comprises the L' strongest spatial domain components amongst the 2L spatial domain components. The measure for what are the "strongest" may be based on received power, for example.

In step 802, the gNB 110 applies the set of M' FD components in precoding of a plurality of downlink reference signals. These reference signals may be called auxiliary or optional downlink reference signals, or a first set of downlink reference signals, in order to separate those from the downlink reference signals mentioned e.g. in FIGS. 3-4. However, the following refers to these auxiliary DL reference signals simply as downlink reference signals. The frequency domain components, corresponding to the delay information due to time-frequency duality, may be determined in step 802 based on the received UL SRS. In an embodiment, a downlink reference signal comprises a channel state information reference signal (CSI-RS). In an embodiment, the downlink reference signal comprises another reference signal than CSI-RS, such as demodulation reference signal (DMRS).

By precoding it may be understood that certain type of information is added to the CSI-RS signal comprising one or more PRB resource-elements. The proposed "FD precoding", also known as "delay precoding", may be defined as applying given complex multiplicative factors to the spatial precoding vectors for different frequency units (such as PRBs), as in FIG. 2A for example. In an embodiment, the FD precoding of the CSI-RS signals/ports is done before IFFT of the transmitter (i.e. in frequency domain). In this context, the to-be-beamformed CSI-RS ports (i.e. CSI-RS signals) are windowed M' times.

In an embodiment, the gNB 110 applies the set of M' frequency domain components identically to each spatial domain component in the precoding. This may mean that the same M' frequency domain components are used to precode the downlink reference signals, even if different SD beams are used for these downlink reference signals.

In an embodiment, the gNB 110 may further apply the L' spatial domain components in the precoding. Thus, this step entails application of also spatial information, in addition to the delay information, in the downlink reference signal precoding. Spatial precoding may comprise transmitting a CSI-RS symbol through a number of antenna ports with a given complex multiplicative factor (the set of these factors forming a precoding vector). Thus, in an embodiment, the precoding comprises applying for each DL reference signal, comprising one or more resource elements of the PRB, a frequency-domain precoder that is based on a combination of one spatial beam with at least one phase ramp in frequency, each phase ramp corresponding to one component of the corresponding delay profile of the communication channel. The phase ramps in frequency correspond to components of the time-domain support of the channel, based on the frequency-time duality.

The method of FIG. 8 may then continue by the gNB 110 transmitting the plurality of precoded downlink reference signals to the UE 120 in step 804. The gNB 110 may e.g. beamform each CSI-RS port (also called CSI-RS signal) with the above-mentioned frequency-domain precoder. The gNB 110 may in step 806 send a multiplicity of CSI-RSs for each spatial beam, like in FIG. 2A where there are 3 FD components for each spatial beam, and thus three CSI-RSs for one spatial beam. In an embodiment, the gNB 110 transmits the precoded CSI-RS ports in each of the configured subbands. The subbands may be preconfigured to the UE 120 by the gNB 110 beforehand and/or depend on the capabilities of the UE 120. Assuming M' is larger than one, then there are at least two downlink RSs, even with a single beam.

In an embodiment, the gNB 110 may transmit, to the UE 120, an indication indicating whether the delay and/or the spatial information is used for precoding of the DL reference signal at the gNB 110. This way, the UE 120 may know beforehand how the CSI-RS is precoded at the gNB side. For example, the UE 120 may be configured, e.g. by the gNB 110, with aperiodic CSI trigger state list and/or semi-persistent CSI trigger state list. Each trigger state may be associated with a CSI reporting configuration set that includes information/fields related to partial-reciprocity operations. Information/fields related to partial-reciprocity may include explicit or implicit indication (e.g. number of CSI-RS ports) on the DL reference signal precoding, specifying if spatial domain, frequency domain or a combination of the two is used at the gNB side.

One goal of this operation may be to enable the UE 120 to estimate linear combination non-zero coefficients by a summation of the beamformed CSI-RS over the configured sub-bands for every spatial beam, wherein the summation may be weighted. For example, in the example embodiment of FIG. 2A, the UE 120 may sum the $S_{CSI-RS, 0}$ (i.e. channel estimates) over all PRBs in many subbands to reach one $S_{CSI-RS, 0}$ for that spatial beam. One subband may comprise e.g. multiple PRBs. After receiving the indication (e.g. over RRC signaling), may understand that the pilots have been windowed already by the phase ramps. This may be why a simple summation (dot product operation) may be sufficient at the UE. If the pilots are not windowed, and the UE 120 still performs the summation, then it will not provide the right feedback.

Thus, the gNB may, when performing steps 800-804, have selected the strongest L'; 2L SD beams and transmitted the windowed M' CSI-RS sequences from L'M' CSI-RS ports on the DL. In an embodiment, L'M'<2LM. Each of the L'M' virtual CSI-RS ports is precoded with the combination of one SD beam and one FD component/phase ramp. M denotes the refined number of FD components, as will be explained. It is noted that the channel support of all SD beams 2L is substantially the same as that of the L' strongest beams.

In step 806, the gNB 110 may receive feedback from the UE 120 as a response to the transmission of the plurality of precoded downlink reference signals, and in step 808 modify the set of frequency domain components based on the feedback.

In an embodiment, the UE 120 may transmit and the gNB 110 may receive the feedback separately for each spatial domain component of the plurality of downlink reference signals.

Let us look closer at the UE's reception and handling of the precoded reference signals, according to some embodiments. Let $s_m=[s_m(0), \ldots, s_m(n_{PRB}-1)]^T$, such that $s_m^H s_m=1$, be the vector of transmitted pilots across PRBs for the m-th FD component, where $n_{PRB}$ is the total number of allocated PRBs for the UE 120, and $h_f=[h_f(0), \ldots, h_f(n_{PRB}-1)]^T$ be the vector carrying the $n_{PRB}$ channel coefficients measured/obtained for the bandwidth configured for CSI report. Note that here $W_f$ is assumed to be drawn from a DFT codebook of size $n_{PRB} \times n_{PRB}$, unlike above, where it was assumed to be drawn from a DFT codebook of size $N_3 \times N_3$.

Assuming a CSI-RS density of 1, and L'=1 SD beam used for sweeping, the received OFDM signal (without application of the proposed embodiments) can be written as:

$$r = \check{H}s, \quad (6)$$

where r is a $n_{PRB}$-sized vector, and $$\check{H} = \text{diag}(h) = \begin{bmatrix} h_f(0) & & \\ & \ddots & \\ & & h_f(n_{PRB}-1) \end{bmatrix} \quad (7)$$

is a $n_{PRB} \times n_{PRB}$-sized matrix. Consider the $n_{PRB}$-sized m-th column of $W_f$, denoted by $W_{f,m}$. If the pilot sequence is windowed by that column, the transmitted pilot sequence can be written as:

$$s_m^w = \check{W}_{f,m} s_m \quad (8)$$

$$\text{Where } \check{W}_{f,m} = \text{diag}(W_{f,m}) = \begin{bmatrix} W_{f,m}(0) & & \\ & \ddots & \\ & & W_{f,m}(n_{PRB}-1) \end{bmatrix} \quad (8b)$$

is a $(n_{PRB} \times n_{PRB})$-sized matrix. Note that the resolution of $W_f$ is configured by the gNB 110. For example, if $N_3$ is the number of subbands and the system has $$\frac{n_{PRB}}{N_3}$$

PRBs per subband, for a type II CSI feedback, the gNB 110 may design $W_f$ to be drawn from an $N_3 \times N_3$ DFT codebook. In other words, all $$\frac{n_{PRB}}{N_3}$$

PRBs within 1 subband are multiplied by the same windowing factor. For example, for one subband index s, the windowing coefficients within subband index s in equation (8b) are all equal $$W_{f,m}\left(s \times \frac{n_{PRB}}{N_3}\right) = W_{f,m}\left(s \times \frac{n_{PRB}}{N_3} + 1\right) = \ldots = W_{f,m}\left(s \times \frac{n_{PRB}}{N_3} + \frac{n_{PRB}}{N_3} - 1\right)$$

The received signal can then be written as:

$$r = \check{H}\check{W}_{f,m} s_m. \quad (9)$$

At the UE 120 side, a simple inner product between the received signal and the pilot sequence, i.e., $s_m^H r$, yields the effective channel coefficient associated to the m-th FD component (or, alternatively, delay):

$$h_{eff,m} = s_m^H \check{H} \check{W}_{f,m} s_m, \quad (10)$$

which can be expanded as $$h_{eff,m} = s_m^H \begin{bmatrix} W_{f,m}(0) h_f(0) & & \\ & \ddots & \\ & & W_{f,m}(n_{PRB}-1) h_f(n_{PRB}-1) \end{bmatrix} s_m^H = \quad (11)$$

-continued $$\sum_{i=0}^{n_{PRB}-1} W_{f,m}(i)h_f(i).$$

FIG. 10 depicts an example of the proposed scheme for delay sweeping, where the n-th PRB is considered, L'=1 SD beam is assumed and M'=8 windowed CSI-RS sequences, i.e., $\{s_0(n), \ldots, s_7(n)\}$, are transmitted from the gNB 110 to the UE 120. The UE may be configured to select the strongest M FD components, out of M' CSI-RS sequences. By performing the dot product in equation (10) for all M' CSI-RS sequences, the UE 120 can recognize the strongest M FD components and possibly feedback their indices to the gNB 110.

Note that (11) computed the channel coefficient assuming 1 SD beam. In the general case L'≥1 may be used. For every FD component m, the effective channel coefficient on every beam l, $h_{\mathit{eff},l,m}$, is computed according to (11) and the final stacked vector for FD component m can be written as $$h_{\mathit{eff},m}=[h_{\mathit{eff},0,m}\ldots h_{\mathit{eff},L'-1,m}]^T \quad (12)$$

In an embodiment, the feedback indicates indices of the strongest M frequency domain components amongst the M' frequency domain components, where M<M'. One benefit may be that the UL overhead is reduced because the feedback may comprise only the indices and not the quantized complex coefficients. In other words, the UE 120 may determine the strongest M FD components of the received downlink RS. For example, the UE 120 may first perform the summing of the channel estimates $S_{CSI-RS,0}$ over all PRBs to reach one $S_{CSI-RS,0}$ for that spatial beam. Then, the values of the summed frequency domain components may be compared and only strongest M be selected. Then, the indices of those FD components may be fed back to the gNB 110. However, there can be other ways for the UE 120 to select the strongest M FD components.

In an embodiment, oversampling may be used for the M' frequency domain components. In that case, the UE 120 may transmit as the feedback, an oversampling group index and the indices of the strongest M frequency domain components within the indicated oversampling group.

For example, an oversampling factor $O_3>1$ can be introduced at the gNB side. In this case, the size of the DFT codebook from which $W_f$ is drawn is $n_{PRB}\times O_3 n_{PRB}$. In such case, only orthogonal FD components may be selected by the UE 120. If the UE is configured with $O_3>1$, the UE 120 may feedback two indicators: 1) the oversampling group index $k\in 0, \ldots O_3-1$, and 2) $i_M$: M FD components indices within the selected group $$\mathcal{M} \subseteq \left\{0, \ldots, \frac{M'}{O_3}-1\right\}.$$

For instance, if $O_3=2$ and M=2, and assuming that the two oversampled groups are $\{s_0(n), \ldots, s_3(n)\}$ and $\{s_4(n), \ldots, s_7(n)\}$, the UE 120 sends either k=0 or k=1 to refer to one of the two groups and additionally selects M=2 FD components within the selected group (0 or 1).

The abovementioned restriction at the UE 120 to select only M FD components within a selected group, may require knowledge at the UE side on which FD components belong to which groups. This can be achieved in e.g. two possible ways:

1. Having a fixed configuration in the specification (i.e. preconfigured) in which case the gNB 110 may use the preconfigured mapping between the M' FD components and the oversampling groups. For example, the two oversampling groups can be taken in order of CSI-RS resource elements, such that the two oversampled groups are $\{s_0(n), \ldots, s_3(n)\}$ and $\{s_4(n), \ldots, s_7(n)\}$
2. The mapping between the oversampling groups and the M' FD components is configured by the gNB 110 e.g. during RRC signaling to UE 120. In this case, the gNB 110 may inform the UE 120 about which CSI-RSs map to which M' FD components (consequently to which oversampling groups)

In an embodiment, the configuration for the proposed delay sweeping procedure comprises $M'=O_3 M$. In that case, the gNB needs only to find the oversampling group index k and all the FD components within this group will be selected, so UE does not need to feed back $i_M$.

Although the same FD component selection for all SD beams has been assumed in some example embodiments, in some other embodiments, for example when operating with a very large bandwidth, it may be meaningful to select different channel supports (i.e. FD components) for different SD components/beams. As a result, and depending on the required resolution of $W_f$ at gNB side, the UE 120 may also be configured in some embodiments to report a different set of oversampling group index and/or M FD components indices for every SD beam, i.e., k, and/or $i_{l,M}$, for every $l\in\{0, \ldots, L'\}$. In this case, in an embodiment, the number of M' FD components may vary between the different SD components/beams.

FIG. 11 depicts gNB-UE procedure for the proposed delay sweeping. For L' SD beams $h_{\mathit{eff},m}$ is computed for each of the M' possible sequences according to equation (12), i.e. $\forall m\in\{0, \ldots, M'-1\}$. $H_{\mathit{eff}_{L'\times M'}}$ is then built by stacking horizontally $h_{\mathit{eff},m} \forall m\in\{0, \ldots, M'-1\}$ on its columns to give the L'×M' matrix:

$$H_{\mathit{eff}}=[h_{\mathit{eff},0}\ldots h_{\mathit{eff},M'-1}] \quad (13)$$

One way to perform the delay selection would be to average $H_{\mathit{eff}_{L'\times M'}}$ over all L' SD beams, to obtain $\overline{H}_{\mathit{eff}}$ which is of size 1×M'. From $\overline{H}_{\mathit{eff}}$, the strongest M FD components may then be selected, as shown in FIG. 11. This FIG. 11 assumes oversampling factor $O_3$ being used, but the general principle illustrated in this Figure applies also without oversampling.

FIG. 11 provides a framework in which knowledge of $W_f$ would be required at the gNB 110 side for any purpose, e.g. other than FD precoding in DL. One purpose may be to do a port specific phase ramp to align all the taps within a window, such that the equivalent channel across the different beams have all the taps within a small window. This may reduce the residual CSI after tap selection.

In an embodiment, the feedback indicates values of the strongest M frequency domain components amongst the M' frequency domain components, where M<M'. That is, the UE 120 can also be configured to feed back the complex coefficients on the selected M FD components over the L' SD beams e.g. in addition to the two indicators k and $i_M$. In this case, the UE-gNB procedure shown in FIG. 11 may differ in the last step as shown in FIG. 12 where, in addition to the feedback of the indicators, the UE 120 also feeds back the quantized compressed channel measured for the L' SD beams and selected M FD components $\tilde{H}_{\mathit{eff}}$. $\tilde{H}_{\mathit{eff}}$ is built by selecting the columns inside $H_{\mathit{eff}}$ which correspond to the selected M FD components. The gNB 110 may use this information to update its knowledge on $W_f$ and the compressed channel information.

However, although in some embodiments L'<2L, it is possible that L'=2L, in which case the complete spatial domain based on the UL RS is used for the precoding. In this case, the gNB 110 may transmit the M' windowed CSI-RS over the 2L beams (2LM' virtual ports), in which case the UE 120 may feedback both an indicator of the best FD components of $W_f$ and the corresponding scaling factors corresponding to the combination of $W_1$.

After the gNB 110 receives knowledge of the M FD components (e.g. the indices and/or LC coefficients), the gNB 110 may modify the set of FD components. One modification may be to reduce the number of FD components in the set of FD components from M' FD components to M FD components. In other words, the gNB 110 may first, based on the received UL RS for example, determine M' FD components, where M' is a relatively large number, to depict the delay profile of the channel accurately. Then, the UE 120 may feedback information of only M (less than M') FD components. Based on this information, the gNB 110 may determine a set of M FD components (i.e. modify the set of M' components by removing one or more FD components which were not feedback by the UE 120). It is considered that the M FD components depict the delay profile of the channel sufficiently well.

In an embodiment, the UE 120 may be informed by the gNB 110 (or the UE 120 is preconfigured with information) that the UE 120 needs to determine and feedback only M FD components amongst the received M' FD components. Such configuration information may be provided to the UE 120 from the gNB 110 via RRC signaling, for example. Similarly, the value of M may be indicated to the UE 120 or the UE 120 may be preconfigured with such information.

In an embodiment, once the gNB learns $W_f$, based on the refined M FD components, and $W_1$, based on the 2L SD components, the gNB 110 can follow any method which exploits knowledge of these at gNB 110, such as the procedures of CSI scheme #A. In general, the gNB 110 may, once knowing the refined set of M FD components, then apply the set of M FD components for communication with the UE 120. Further, the 2L SD components may be used for the communication with the UE 120. It needs to be noted that in some embodiments, only the set of refined M FD components is needed and not the 2L SD components. Thus, the delay sweeping proposal depicted with the embodiments of the application may at least partially aim at how to obtain $W_f$ at gNB side, or how an UL RS-based $W_f$ estimation can be fine-tuned.

As said, M' L' is in an embodiment smaller than 2LM. E.g. in the CSI scheme #A, assuming 2L spatial beams and M FD components, the gNB needs to allocate 2LM DL resources in order to receive $W_2$ on the UL for all M FD components. If the gNB's knowledge of $W_f$ is not sufficient, a larger number of windowed CSI-RS sequences, assuming M'>M FD components, can be sent based on the received quantized value of $\tilde{W}_2$. The gNB would then refine its knowledge on $W_f$. However, the number of required DL CSI-RSs scales with 2L, hence this may put a limitation on the maximum amount of FD components that can be scanned, i.e., M'. Further, the quantized coefficients of $\tilde{W}_2$ on the unselected 2L(M'-M) FD components may not be exploited at gNB. This might translate into inefficient usage of UL resources. This may be one reason why it may be beneficial to apply the proposed delay sweeping procedure to first refine $W_f$ based on M'L' selection, instead of M'2L.

FIG. 9 depicts an example method. The method may be performed by a user equipment, such as the UE 120 of FIG. 1. For the sake of simplicity, let us assume that the method is performed by the UE 120. Accordingly, as shown in FIG. 9, the UE 120 may in step 900 receive, from the gNB 110, a plurality of downlink reference signals, wherein the precoding of the plurality of downlink reference signal is based on M' frequency domain components. In an embodiment, the UE 120 may transmit an UL RS, such as SRS, to the gNB 110, the UL RS indicating delay information of the communication channel and thus enabling determination of M' frequency domain components at the gNB 110. In an embodiment, the UL RS further indicates spatial information regarding the communication channel, the spatial information enabling determination of 2L SD components at the gNB 110. Then, as has been explained, the plurality of downlink reference signals may be further precoded with L' spatial domain components amongst the 2L spatial domain components, where L'<=2L.

In step 902, the UE 120 may estimate M strongest frequency domain components amongst the M' frequency domain components based on the received plurality of downlink reference signals, where M is smaller than M', and in step 404 transmit feedback of the received plurality of DL reference signals to the gNB 110, the feedback providing information of the determined M strongest FD components.

In an embodiment, the UE 120 determines indices of the M strongest frequency domain components amongst the M' frequency domain components and provides the indices as the feedback in step 904. In an embodiment, the UE 120 in addition or alternatively, determines values of coefficients of the M strongest frequency domain components, and provides the values of the M strongest FD components in the feedback.

In an embodiment, the UE 120 detects that oversampling is applied for the M' frequency domain components. This may happen e.g. via RRC signaling from the gNB 110. The UE 120 may then provide, as the feedback, oversampling group indication and indices of the M strongest FD components within the indicated oversampling group. In an embodiment, the UE 120 may receive from the gNB 110 a mapping configuration between the oversampling groups and the M' FD components.

In an embodiment, when a different set of M' frequency domain components are applied to at least two different spatial domain components in the precoding, the UE may determine the strongest M frequency domain components for each spatial beam separately, and then provide, as the feedback, different set of M frequency domain components for each of the corresponding at least two spatial beams.

Once the gNB 110 has received the knowledge of the M FD components based on the feedback, the UE 120 may perform communication with gNB 110 at least partially based on M FD components and/or based on the 2L SD components.

In an embodiment, the delay sweeping may be iteratively performed multiple times before e.g. the CSI scheme #A is applied. This may allow for updating the accuracy of the FD components. For example, on a second iteration, the M' FD components may be different than on the first round as time may have passed in between. Also, the gNB 110 may not necessarily decide to change the $W_f$ after the delay sweeping operation, e.g. if the feedback from the UE does not change the existing estimate of $W_f$. In other words, use of the refined $W_f$ may not be as frequent as the delay sweeping procedure for refining the $W_f$.

In an embodiment, the proposed delay sweeping of FIGS. 8 and 9 may be applied in connection of the CSI scheme #A. In this case, the gNB may receive an uplink reference signal from a user equipment. The gNB may determine a set of M' frequency domain components for the channel between the UE and the gNB. This may be based on the received UL RS. Then the gNB may perform the remaining steps of FIG. 8. When the gNB has obtained knowledge of the delay information, the gNB may apply the delay information in precoding of at least one DL reference signal and transmit the at least one precoded DL reference signal to the UE. In an embodiment, the gNB may also apply spatial information in this precoding (e.g. based on 2L spatial components). Then, the UE may determine channel information based on the received at least one precoded downlink reference signal, the channel information indicating at least non-zero coefficients of at least one channel transmission layer, and transmit the channel information to the gNB. Determining the channel information may comprise estimating channel coefficients for each subband configured for the UE based on the at least one precoded downlink reference signal and summing the estimated channel coefficients over the subbands. The non-zero coefficients of the at least one channel transmission layer may indicate non-zero coefficients per each spatial beam and per each frequency domain component or a group of frequency domain components of the communication channel. The gNB may thus receive, from the user equipment as a response to the transmission of the at least one precoded downlink reference signal, channel information, the channel information indicating at least non-zero coefficients of at least one channel transmission layer. In this way, the gNB may determine, based on the received channel information, at least one of a precoder matrix for the communication channel and a channel matrix of the communication channel, and apply beamforming for data transmission to the user equipment at least partially based on one or both of the matrices.

The gNB 110 may perform the method of FIG. 3 only (and possibly one or more of the embodiments related to that method), perform the method of FIG. 8 only (and possibly one or more of the embodiments related to that method), or perform the method of FIG. 3 in connection of the method of FIG. 8 (and possibly one or more of the embodiments related to one or both of those methods). The UE 120 may perform the method of FIG. 4 only (and possibly one or more of the embodiments related to that method), perform the method of FIG. 9 only (and possibly one or more of the embodiments related to that method), or perform the method of FIG. 4 in connection of the method of FIG. 9 (and possibly one or more of the embodiments related to one or both of those methods).

Figure 6:
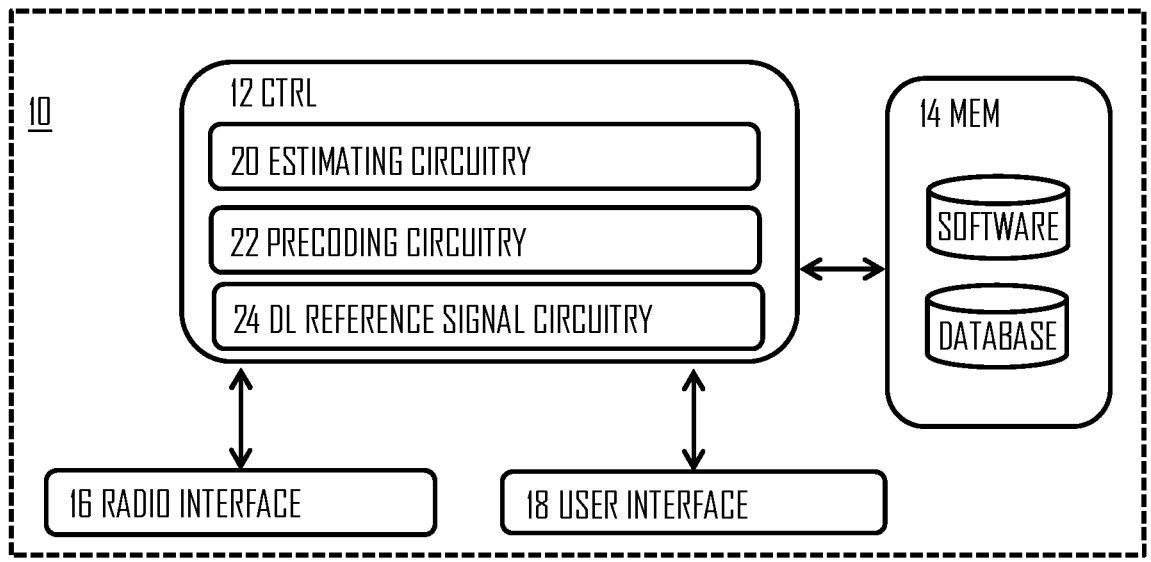
FIGS. 6 and 7 illustrate apparatuses, according to some embodiments.

An embodiment, as shown in FIG. 6, provides an apparatus 10 comprising a control circuitry (CTRL) 12, such as at least one processor, and at least one memory 14 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may be or be comprised in a network node, such as in gNB/gNB-CU/gNB-DU of 5G. In an embodiment, the apparatus is or is comprised in the network node 110. The apparatus may be caused to execute some of the functionalities of the above described processes, such as the steps of FIG. 3 and/or FIG. 8.

In an embodiment, a CU-DU (central unit-distributed unit) architecture is implemented. In such case the apparatus 10 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be standalone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 10 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise an estimating circuitry 20 for estimating the delay and spatial information from the received UL reference signal, according to any of the embodiments. The estimation circuitry 20 may also estimate the precoder matrix at least partially based on the received CSI. This circuitry 20, or additional circuitry (not shown) may be further for refining the delay information, according to any of the embodiments. The control circuitry 12 may further comprise a precoding circuitry 22 for precoding the DL reference signal also with frequency domain subset, according to any of the embodiments. The control circuitry 12 may further comprise a DL reference signal circuitry 24 for transmitting the DL reference signal to one or more UEs, according to any of the embodiments.

Figure 7:
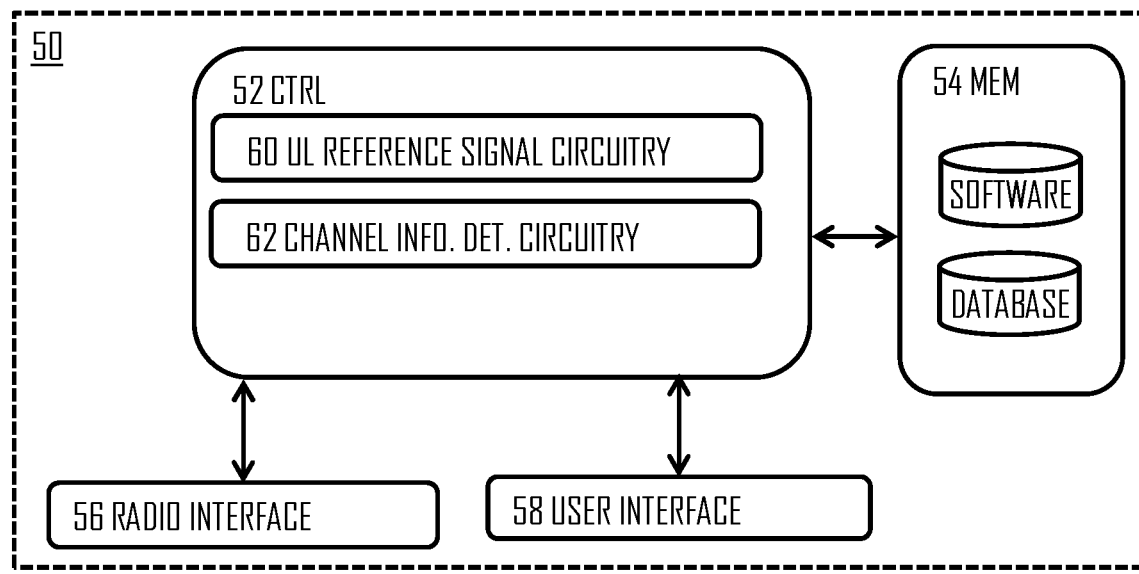

An embodiment, as shown in FIG. 7, provides an apparatus 50 comprising a control circuitry (CTRL) 52, such as at least one processor, and at least one memory 54 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 50 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly. In an embodiment, the apparatus 50 is or is comprised in the UE 120. The apparatus may be caused to execute some of the functionalities of the above described processes, such as the steps of FIG. 4 and/or FIG. 9.

The apparatus may further comprise communication interface (TRX) 56 comprising hardware and/or software for realizing communication connectivity according to one or more communication protocols. The TRX may provide the apparatus with communication capabilities to access the radio access network, for example. The apparatus may also comprise a user interface 58 comprising, for example, at least one keypad, a microphone, a touch display, a display, a speaker, etc. The user interface may be used to control the apparatus by the user.

The control circuitry 52 may comprise an UL reference signal circuitry 60 for compiling and transmitting the UL reference signal, such as SRS, to the gNB, according to any of the embodiments. This circuitry 60, or additional circuitry (not shown) may be further for refining the delay information, according to any of the embodiments. The control circuitry 52 may comprise a channel information determination circuitry 62 e.g. for determining CSI based on the received CSI-RS, for example.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a first list of some aspects of the invention.

According to a first aspect, there is provided an apparatus, comprising: at least one processor and at least one memory including a computer program code, wherein the at least one memory and the computer program code are configured, with the at least one processor, to cause the apparatus to perform operations comprising: receiving an uplink reference signal from a user equipment; estimating, based on the received uplink reference signal, delay information regarding a delay profile of a communication channel between the user equipment and the apparatus and spatial information regarding the communication channel; applying both the delay information and the spatial information in precoding of at least one downlink reference signal; transmitting the at least one precoded downlink reference signal to the user equipment; and receiving, from the user equipment as a response to the transmission of the at least one precoded downlink reference signal, channel information, the channel information indicating at least non-zero coefficients of at least one channel transmission layer.

Various embodiments of the first aspect may comprise at least one feature from the following bulleted list:

wherein the uplink reference signal comprises a sounding reference signal, SRS, the downlink reference signal comprises a channel state information reference signal, CSI-RS, the channel information is channel state information, CSI, and determining the delay information is based on channel reciprocity.

wherein the delay information indicates a delay for each path of the communication channel with respect to a reference time.

wherein the spatial information indicates an angle-of-arrival for each path of the communication channel with respect to a reference angle.

wherein the precoding comprises applying for each downlink reference signal a frequency-domain precoder that is based on a combination of one spatial beam with at least one phase ramp in frequency, each phase ramp corresponding to one component of the corresponding delay profile of the communication channel.

wherein the precoded downlink reference signal enables the user equipment to estimate channel coefficient for each subband configured for the user equipment based on the at least one precoded downlink reference signal and to perform summation of the estimated channel coefficients over the subbands, in order to derive the non-zero coefficients of the at least one channel transmission layer.

wherein the non-zero coefficients of the at least one channel transmission layer indicate non-zero coefficients per each spatial beam and per each frequency domain component or a group of frequency domain components of the communication channel.

wherein the channel information does not comprise information indicating non-zero coefficients for any subband separately.

wherein the channel information does not comprise a bitmap indicating locations of the non-zero coefficients within a precoding matrix indicator.

determining, based on the received channel information, at least one of a precoder matrix for the communication channel and a channel matrix of the communication channel; and applying beamforming for data transmission to the user equipment at least partially based on one or both of the matrices.

transmitting, to the user equipment, an indication indicating whether the delay and the spatial information is used for precoding of the downlink reference signal at the apparatus.

According to a second aspect, there is provided an apparatus, comprising: at least one processor and at least one memory including a computer program code, wherein the at least one memory and the computer program code are configured, with the at least one processor, to cause the apparatus to perform operations comprising: transmitting an uplink reference signal to a network node, the uplink reference signal indicating delay information regarding a delay profile of a communication channel between the apparatus and the network node and spatial information regarding the communication channel; receiving, as a response to transmitting the uplink reference signal, at least one downlink reference signal, wherein the at least one downlink reference signal is precoded at least based on the delay information and the spatial information; determining channel information based on the received at least one precoded downlink reference signal, the channel information indicating at least non-zero coefficients of at least one channel transmission layer; and transmitting the channel information to the network node.

Various embodiments of the second aspect may comprise at least one feature from the following bulleted list:

wherein the uplink reference signal comprises a sounding reference signal, SRS, the downlink reference signal comprises a channel state information reference signal, CSI-RS, the channel information comprises channel state information, CSI.

wherein determining the channel information comprises estimating channel coefficients for each subband configured for the apparatus based on the at least one precoded downlink reference signal and summing the estimated channel coefficients over the subbands.

wherein the non-zero coefficients of the at least one channel transmission layer indicate non-zero coefficients per each spatial beam and per each frequency domain component or a group of frequency domain components of the communication channel.

receiving, from the network node, an indication indicating whether the delay and the spatial information is used in the precoding of the downlink reference signal at the network node.

According to a third aspect, there is provided a method at a network node, comprising: receiving an uplink reference signal from a user equipment; estimating, based on the received uplink reference signal, delay information regarding a delay profile of a communication channel between the user equipment and the network node and spatial information regarding the communication channel; applying both the delay information and the spatial information in precoding of at least one downlink reference signal; transmitting the at least one precoded downlink reference signal to the user equipment; and receiving, from the user equipment as a response to the transmission of the at least one precoded downlink reference signal, channel information, the channel information indicating at least non-zero coefficients of at least one channel transmission layer. Various embodiments of the third aspect may comprise at least one feature from the bulleted list under the first aspect.

According to a fourth aspect, there is provided a method at a user equipment, comprising: transmitting an uplink reference signal to a network node of the communication network, the uplink reference signal indicating delay information regarding a delay profile of a communication channel between the user equipment and the network node and spatial information regarding the communication channel; receiving, as a response to transmitting the uplink reference signal, at least one downlink reference signal, wherein the at least one downlink reference signal is precoded at least based on the delay information and the spatial information; determining channel information based on the received at least one precoded downlink reference signal, the channel information indicating at least non-zero coefficients of at least one channel transmission layer; and transmitting the channel information to the network node. Various embodiments of the fourth aspect may comprise at least one feature from the bulleted list under the second aspect.

According to a fifth aspect, there is provided a computer program product embodied on a distribution medium readable by a computer and comprising program instructions which, when loaded into an apparatus, execute the method according to the third aspect.

According to a sixth aspect, there is provided a computer program product embodied on a distribution medium readable by a computer and comprising program instructions which, when loaded into an apparatus, execute the method according to the fourth aspect.

According to a seventh aspect, there is provided a computer program product comprising program instructions which, when loaded into an apparatus, execute the method according to the third aspect.

According to an eight aspect, there is provided a computer program product comprising program instructions which, when loaded into an apparatus, execute the method according to the fourth aspect.

According to a ninth aspect, there is provided an apparatus, comprising means for performing the method according to the third aspect, and/or means configured to cause a network node to perform the method according to the third aspect.

According to a tenth aspect, there is provided an apparatus, comprising means for performing the method according to the fourth aspect, and/or means configured to cause a user equipment to perform the method according to the fourth aspect.

According to an eleventh aspect, there is provided computer system, comprising: one or more processors; at least one data storage, and one or more computer program instructions to be executed by the one or more processors in association with the at least one data storage for carrying out the method according to the third aspect and/or the method according to the fourth aspect.

The first list of aspects ends here.

Following is a second list of some aspects of the invention.

According to a first aspect, there is provided an apparatus, comprising at least one processor and at least one memory including a computer program code, wherein the at least one memory and the computer program code are configured, with the at least one processor, to cause the apparatus to perform operations comprising: determining a set of M' frequency domain components for a communication channel between a user equipment and a network node; applying the set of M' frequency domain components in precoding of a plurality of downlink reference signals; transmitting the plurality of precoded downlink reference signals to the user equipment; receiving feedback from the user equipment as a response to the transmission of the plurality of precoded downlink reference signals; and modifying the set of M' frequency domain components based on the feedback.

Various embodiments of the first aspect may comprise at least one feature from the following bulleted list:
- wherein the feedback indicates indices of the strongest M frequency domain components amongst the M' frequency domain components, where M<M'.
- wherein the feedback indicates values of the strongest M frequency domain components amongst the M' frequency domain components, where M<M'.
- applying oversampling for the M' frequency domain components; receiving, as the feedback from the user equipment, an oversampling group index and indices of the strongest M frequency domain components within the indicated oversampling group.
- providing, to the user equipment, mapping configuration between the oversampling groups and the M' frequency domain components.
- applying the set of M' frequency domain components identically to each spatial domain component in the precoding.
- applying a different set of M' frequency domain components to at least two spatial domain components in the precoding.
- wherein the set of frequency domain components comprises M' frequency domain components before the modifying and M frequency domain components after the modifying.
- receiving an uplink reference signal from the user equipment; estimating, based on the received uplink reference signal, delay information regarding the communication channel; determining the set of M' frequency domain components based on the delay information.
- determining a set of 2L spatial domain components for the communication channel; selecting L' spatial domain components amongst the 2L spatial domain components, wherein L'<2L; applying the L' spatial domain components in the precoding.
- applying the modified set of frequency domain components for communication with the user equipment.

According to a second aspect, there is provided an apparatus, comprising: at least one processor and at least one memory including a computer program code, wherein the at least one memory and the computer program code are configured, with the at least one processor, to cause the apparatus to perform operations comprising: receiving, from a network node, a plurality of downlink reference signals, wherein the precoding of the plurality of downlink reference signal is based on M' frequency domain components; estimating M strongest frequency domain components amongst the M' frequency domain components based on the received plurality of downlink reference signals, where M<M'; and transmitting feedback of the received plurality of downlink reference signals to the network node, the feedback providing information of the determined M strongest frequency domain components.

Various embodiments of the second aspect may comprise at least one feature from the following bulleted list:
- determining indices of the M strongest frequency domain components amongst the M' frequency domain components; and providing the indices of the M strongest frequency domain components in the feedback.
- determining values of coefficients of the M strongest frequency domain components; and providing the values of the M strongest frequency domain components in the feedback.

detecting that oversampling is applied for the M' frequency domain components; providing, in the feedback, oversampling group indication and indices of the M strongest frequency domain components within the indicated oversampling group.

receiving from the network node a mapping configuration between the oversampling groups and the M' frequency domain components.

providing the feedback separately for each spatial domain component of the plurality of downlink reference signals.

when a different set of M' frequency domain components are applied to at least two different spatial domain components in the precoding, determining the strongest M frequency domain components for each of the corresponding at least two spatial domain components separately; and providing, in the feedback, different set of M frequency domain components for each of the corresponding at least two spatial domain components.

transmitting an uplink reference signal to the network node, the uplink reference signal indicating delay information of the communication channel between the apparatus and the network node, the delay information enabling determination of M' frequency domain components at the network node.

performing communication with network node at least partially based on M frequency domain components.

According to a third aspect, there is provided a method at a network node, the method comprising: determining a set of M' frequency domain components for a communication channel between a user equipment and a network node; applying the set of M' frequency domain components in precoding of a plurality of downlink reference signals; transmitting the plurality of precoded downlink reference signals to the user equipment; receiving feedback from the user equipment as a response to the transmission of the plurality of precoded downlink reference signals; and modifying the set of M' frequency domain components based on the feedback.

Various embodiments of the third aspect may comprise at least one feature from the bulleted list under the first aspect.

According to a fourth aspect, there is provided a method at a user equipment, the method comprising: receiving, from a network node, a plurality of downlink reference signals, wherein the precoding of the plurality of downlink reference signal is based on M' frequency domain components; estimating M strongest frequency domain components amongst the M' frequency domain components based on the received plurality of downlink reference signals, where M<M'; and transmitting feedback of the received plurality of downlink reference signals to the network node, the feedback providing information of the deter-mined M strongest frequency domain components.

Various embodiments of the fourth aspect may comprise at least one feature from the bulleted list under the second aspect.

According to a fifth aspect, there is provided a computer program product embodied on a distribution medium readable by a computer and comprising program instructions which, when loaded into an apparatus, execute the method according to the third aspect.

According to a sixth aspect, there is provided a computer program product embodied on a distribution medium readable by a computer and comprising program instructions which, when loaded into an apparatus, execute the method according to the fourth aspect.

According to a seventh aspect, there is provided a computer program product comprising program instructions which, when loaded into an apparatus, execute the method according to the third aspect.

According to an eight aspect, there is provided a computer program product comprising program instructions which, when loaded into an apparatus, execute the method according to the fourth aspect.

According to a ninth aspect, there is provided an apparatus, comprising means for performing the method according to the third aspect, and/or means configured to cause a user equipment to perform the method according to the third aspect.

According to a tenth aspect, there is provided an apparatus, comprising means for performing the method according to the fourth aspect, and/or means configured to cause a user equipment to perform the method according to the fourth aspect.

According to an eleventh aspect, there is provided computer system, comprising: one or more processors; at least one data storage, and one or more computer program instructions to be executed by the one or more processors in association with the at least one data storage for carrying out the method according to the third aspect and/or the method according to the fourth aspect.

The second list of aspects ends here. One or more aspects of the second list may be performed in connection of one or more aspects of the first list.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor and at least one memory including a computer program code, wherein the at least one memory and the computer program code are configured, with the at least one processor, to cause the apparatus to:
   receive an uplink reference signal from a user equipment, wherein the uplink reference signal comprises a sounding reference signal (SRS);
   estimate, based on the received uplink reference signal, delay information regarding a delay profile of a communication channel between the user equipment and the apparatus and spatial information regarding the communication channel, wherein determining the delay information is based on channel reciprocity;
   determine the spatial information regarding the communication channel based on the received uplink reference signal, wherein the delay information indicates a delay for each path of the communication channel with respect to a reference time, and
   wherein a number of paths of the communication channel taken into account, is capped by a predetermined power threshold;
   apply both the delay information and the spatial information in precoding of at least one downlink reference signal, wherein the downlink reference signal comprises a channel state information reference signal (CSI-RS), wherein the precoding comprises applying for each downlink reference signal a frequency-domain precoder that is based on a combination of one spatial beam with at least one precoding vector in frequency, each precoding vector in frequency corresponding to one component of the corresponding delay profile of the communication channel;

transmit a downlink reference signal resource comprising multiple precoded downlink reference signals having a reduced density 1/d, wherein d is an integer between 2 and 4, and the density is defined as a ratio of resource blocks containing the same precoded downlink reference signal to a total number of resource blocks in the configured frequency band;

transmit the at least one precoded downlink reference signal to the user equipment;

transmit, to the user equipment, an indication indicating whether the delay and the spatial information is used for precoding of the at least one downlink reference signal at the apparatus;

receive, from the user equipment as a response to the transmission of the at least one precoded downlink reference signal, channel information, the channel information indicating at least non-zero coefficients of at least one channel transmission layer;

determine locations of the indicated non-zero coefficients without receiving a bitmap indicating the locations of the indicated non-zero coefficients, wherein the determining is based on knowledge of which precoding corresponding to which spatial and frequency domain components the apparatus used in the precoding of the at least one downlink reference signal;

determine a set of M' frequency domain components for a communication channel;

apply the set of M' frequency domain components in precoding of a plurality of auxiliary downlink reference signals;

transmit the plurality of precoded auxiliary downlink reference signals to the user equipment;

receive feedback from the user equipment as a response to the transmission of the plurality of precoded auxiliary downlink reference signals, wherein the feedback indicates indices of the strongest M frequency domain components amongst the M' frequency domain components, where M<M', and wherein M' is a number of candidate frequency domain components determined for a communication channel and M is a number of selected strongest frequency domain components based on a measurement of signal quality or energy; and modify the set of M' frequency domain components based on the feedback, wherein the set of frequency domain components comprises M' frequency domain components before the modifying and M frequency domain components after the modifying.

* * * * *